United States Patent
Burns et al.

(10) Patent No.: US 10,815,966 B1
(45) Date of Patent: Oct. 27, 2020

(54) COMPUTER SYSTEM AND METHOD FOR DETERMINING AN ORIENTATION OF A WIND TURBINE NACELLE

(71) Applicant: Uptake Technologies, Inc., Chicago, IL (US)

(72) Inventors: Brian Burns, Chicago, IL (US); Benedict Augustine, Arlington Heights, IL (US)

(73) Assignee: Uptake Technologies, Inc., Chicago, IL (US)

( * ) Notice: Subject to any disclaimer, the term of this patent is extended or adjusted under 35 U.S.C. 154(b) by 88 days.

(21) Appl. No.: 15/886,648

(22) Filed: Feb. 1, 2018

(51) Int. Cl.
- *F03D 7/02* (2006.01)
- *F03D 7/04* (2006.01)
- *G05B 15/02* (2006.01)

(52) U.S. Cl.
CPC .......... *F03D 7/0204* (2013.01); *F03D 7/045* (2013.01); *F03D 7/048* (2013.01); *G05B 15/02* (2013.01); *F05B 2270/321* (2013.01); *F05B 2270/329* (2013.01); *F05B 2270/404* (2013.01)

(58) Field of Classification Search
CPC ......... F03D 7/0204; F03D 7/048; F03D 7/045
USPC ....................................................... 700/287
See application file for complete search history.

(56) References Cited

U.S. PATENT DOCUMENTS

| | | | |
|---|---|---|---|
| 5,566,092 A | 10/1996 | Wang et al. | |
| 5,633,800 A | 5/1997 | Bankert et al. | |
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |

(Continued)

FOREIGN PATENT DOCUMENTS

| | | |
|---|---|---|
| EP | 3181896 A1 | 6/2017 |
| GB | 2405492 A | 3/2005 |

(Continued)

OTHER PUBLICATIONS

Editors; "Average", Merriam-Webster Dictionary [online], Apr. 2013; Merriam-Webster.com; retrieved from https://web.archive.org/web/20130403202925/https://www.merriam-webster.com/dictionary/average Jan. 31, 2020 (Year: 2013).*

(Continued)

*Primary Examiner* — Mohammad Ali
*Assistant Examiner* — Joshua T Sanders
(74) *Attorney, Agent, or Firm* — Lee Sullivan Shea & Smith LLP

(57) ABSTRACT

A platform may obtain reference data that is indicative of an expected orientation of a wind turbine at one or more past times and use the reference data to determine the expected orientation of the wind turbine at each such times. In addition, the platform may obtain measurement data that is indicative of a measured orientation of the wind turbine at each of the one or more past times and use the measurement data to determine the measured orientation of the wind turbine at each such time. Thereafter, the platform may determine an orientation offset for the wind turbine based on a comparison between the expected and measured orientation of the wind turbine at each of the one or more past times and then cause the orientation offset to be applied to at least one nacelle orientation reported by the wind turbine.

19 Claims, 6 Drawing Sheets

(56) References Cited

U.S. PATENT DOCUMENTS

| | | |
|---|---|---|
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,321,194 B2 | 11/2012 | Meagher et al. |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,606,418 B1 | 12/2013 | Myers et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 10,180,997 B2 | 1/2019 | Kim et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0230377 A1 | 11/2004 | Ghosh et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2010/0274400 A1 | 10/2010 | Ormel et al. |
| 2011/0020122 A1 | 1/2011 | Parthasarathy et al. |
| 2011/0101691 A1* | 5/2011 | Hashimoto ............ F03D 7/0204 290/44 |
| 2012/0053984 A1 | 3/2012 | Manner et al. |
| 2012/0185180 A1 | 7/2012 | Frederiksen |
| 2012/0209539 A1 | 8/2012 | Kim |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0324495 A1 | 10/2014 | Zhou et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2014/0365187 A1 | 12/2014 | Guzman et al. |
| 2015/0046870 A1 | 2/2015 | Goldenberg et al. |
| 2015/0085297 A1* | 3/2015 | Hughes ................ G01S 17/42 356/482 |
| 2015/0262060 A1 | 9/2015 | Husain et al. |
| 2015/0345476 A1* | 12/2015 | Gregg .................... F03D 7/048 702/92 |
| 2016/0032897 A1 | 2/2016 | Hawkins |
| 2016/0034856 A1 | 2/2016 | Son |
| 2016/0169205 A1 | 6/2016 | Wang et al. |
| 2017/0335827 A1 | 11/2017 | Wilson et al. |
| 2018/0010576 A1* | 1/2018 | Brake .................... F03D 7/0204 |
| 2018/0058425 A1* | 3/2018 | Deshpande ............ F03D 9/257 |

FOREIGN PATENT DOCUMENTS

| | | | |
|---|---|---|---|
| KR | 20160073945 A | 6/2016 | |
| WO | 2011117570 | 9/2011 | |
| WO | 2013034420 | 3/2013 | |
| WO | 2014145977 | 9/2014 | |
| WO | 2014205497 | 12/2014 | |
| WO | WO-2017194067 A1 * | 11/2017 | ........... F03D 7/0204 |

OTHER PUBLICATIONS

Biswas, "Redundancy-based Approaches in Wireless Multihop Network Design", PhD Dissertation Submitted to Graduate Faculty of North Carolina State University (2014).

(56) References Cited

OTHER PUBLICATIONS

Isermann, "Model-based Fault Detection and Diagnosis—Status and Applications", Institute of Automatic Control, Darmstadt University of Technology (2004).
Niarasimhan et al, "Combining Model-Based and Feature-Driven Diagnosis Approaches—A Case Study on Electromechanical Actuators", 21st International Workshop on Principles of Diagnosis (2010).
Prentzas et al, Categorizing Approaches Combining Rule-Based and Case-Based Reasoning.
Infor M3 Enterprise Management System, Infor.com (2014).
Infor Equipment, Infor.com (2012).
Infor Introduces Next-Generation Solution for Equipment Dealers and Service Providers, Infor.com (Feb. 20, 2014).
Infor Equipment for Rental, Infor.com (2013).
Waltermire et al, Applying the Continuous Monitoring Technical Reference Model to the Asset, Configuration, and Vulnerability Management Domains (DRAFT), NIST (Jan. 2012).
Z. Daneshi-Far et al., Review of Failures and Condition Monitoring in Wind Turbine Generators, XIX International Conference on Electrical Machines—ICEM 2010, Rome, 1-6. (Year:2010).
Jan Helsen et al., Long Term Monitoring of Wind Farms Using Big Data Approach, 2016 IEEE Second International Conference on Big Data Computing Service and Application, 265-268, (Year: 2016).
Can Huang et al., Maximum Power Point Tracking Strategy for Large-Scale Wind Generation Systems Considering Wind Turbine Dynamics, IEEE Transactions on Industrial Electronics, vol. 62, No. 4, Apr. 2015, 2530-2539. (Year: 2015).
Muhammad Khalid and Andrey V. Savkin, A Method for Short-Term Wind Power Prediction With Multiple Observation Points, IEEE Transactions on Power Systems, vol. 27, No. 2, May 2012, 579-586. (Year: 2012).

\* cited by examiner

COMPUTER SYSTEM AND METHOD FOR DETERMINING AN ORIENTATION OF A WIND TURBINE NACELLE

BACKGROUND

In recent years, there has been a focus on utilizing renewable energy sources to help reduce reliance on fossil fuels. One example renewable energy source is a wind turbine that converts wind's kinetic energy into electricity. Broadly speaking, a wind turbine is an asset that utilizes multiple subsystems to help accomplish this conversion. Typically, a wind site (also known as a "wind farm"), which includes numerous wind turbines, is arranged at a geographical location that experiences windy conditions and provides electricity to an existing power grid. [2] Because of the increasing reliance on wind turbines to generate renewable energy, it is also becoming increasingly desirable to monitor and analyze wind turbines in operation. To facilitate this, some have developed mechanisms to monitor wind turbine attributes and detect abnormalities at a wind turbine.

OVERVIEW

A typical wind turbine includes a nacelle, which is a housing that sits atop the wind turbine and houses components such as a gearbox, drivetrain, a generator, brake assembly, and a control unit, etc. The drive train of the nacelle is coupled to a rotor hub to which the wind turbine's blades are attached. The wind turbine is configured to rotate the position (i.e., the "rotational direction" or "orientation") of the nacelle to face the direction of the wind using a separate component called a yaw system.

The wind turbine is also configured to output a signal that is often referred to as "nacelle position" or "yaw direction," which reports the current orientation of the wind turbine's nacelle. However, the problem is that the "nacelle position" reported by this signal is not accurate, because it does not indicate the nacelle's orientation relative to a standardized reference direction such as true north or another cardinal direction. Rather, the "nacelle position" reported by the signal is the nacelle's orientation relative to the direction that the wind turbine physically faces as it is installed. Put another way, the "nacelle position" signal reports the nacelle's local orientation relative to the as-installed direction of the wind turbine, rather than the nacelle's local orientation relative to standardized reference direction.

To illustrate with an example, if a first wind turbine as installed physically faces 75 degrees relative to true north (i.e., northeast) and the current nacelle orientation of the first wind turbine is 90 degrees relative to true north (i.e., straight east), the first wind turbine will report this nacelle orientation as 15 degrees, whereas if a second wind turbine as installed physically faces 345 degrees relative to true north (i.e., northwest) and the current nacelle orientation of the second wind turbine is also 90 degrees relative to true north (i.e., straight east), the second wind turbine will report this nacelle orientation as 105 degrees. This lack of a standardized frame of reference for the nacelle orientation reported by different wind turbines renders the nacelle orientation signals largely unusable.

In order to address the fact that the nacelle orientation reported by different wind turbines does not have a standardized frame of reference, wind turbines may allow a human operator to "calibrate" the nacelle orientation during installation (or perhaps during a subsequent service call) by manually inputting a value that indicates the direction of the wind turbine as physically installed. For instance, in the above example, a human operator could theoretically input a value of 75 degrees for the first wind turbine—which is the direction that the first wind turbine physically faces relative to true north—and the wind turbine could then apply this value when reporting the nacelle's orientation such that the orientation would be indicted relative to true north rather than to the installation direction of the wind turbine. However, in many instances, this manual calibration process may not result in wind turbines reporting nacelle orientation according to a standardized frame of reference. Indeed, while "manually calibrated" wind turbines that are at the same location should generally be reporting the same nacelle orientation (because they are experiencing the same wind having the same direction, etc.), it has been discovered that the nacelle orientations being reported by these wind turbines tend to vary widely. There may be various reasons for this. As one possibility, while a human operator typically has the option to "calibrate" a wind turbine by inputting its orientation relative to true north, this is not a requirement for installing a wind turbine and thus a human operator may simply choose not to perform any calibration. As another possibility, even if a human operator does choose to manually calibrate the wind turbines, the operator may not do so consistently or accurately across different wind turbines. There may be other reasons why the current manual calibration process does not result in consistent or accurate reporting of nacelle orientation as well.

To address the above issues, disclosed herein is a new approach for determining and reporting the nacelle orientation of a wind turbine. In an implementation, the disclosed approach may be carried out by a data analytics platform that is configured to receive and analyze data related to the operation of wind turbines, which could be implemented in an Internet Area Network (IAN) (e.g., a public, private, or hybrid cloud), a server that is remote from the wind turbine's wind site, or a server that is part of a wind site's control center, as examples. In another implementation, wind turbines themselves could be configured to perform one or more the functions of this disclosed approach.

In accordance with the present disclosure, the wind turbines at a given wind site may each be equipped with sensors or the like that are configured to monitor (1) the operating conditions of the wind turbine, including the wind turbine's nacelle position (e.g. the measured orientation of a given wind turbine's nacelle relative to the orientation of the given wind turbine's tower), and (2) the wind turbine's surrounding environmental conditions, which may include wind speed as one example. Correspondingly, the wind turbines at the given wind site may be configured to generate data indicating the wind turbine's operating conditions and/or surrounding environmental conditions (perhaps along with other data related to the wind turbine), which may then be provided to a data analytics system for further analysis.

For instance, in one implementation, the wind turbine at the given wind site may be configured to individually send data indicating the wind turbine's operating conditions and/or surrounding environmental conditions to a remote data analytics platform (e.g., a data analytics platform implemented in a IAN). In another implementation, the wind turbines at the given wind site may be configured send data indicating the wind turbine's operating conditions and/or surrounding environmental conditions to a control center for the wind site, which may be configured to aggregate the data received from the wind turbines and then send this wind-turbine data to a remote data analytics platform. In yet another implementation, the wind turbines at the given wind site may be configured send data indicating the wind turbine's operating conditions and/or surrounding environmental conditions to a control center for the wind site, but the control center may be configured to operate as a local data analytics platform such that the wind-turbine data need not be sent to a remote data analytics platform. The wind-turbine data for the given wind site may be provided to the data analytics system in other manners as well.

In addition to receiving this wind-turbine data for the given wind site, the data analytics platform may also receive other data related to the operation of the given wind site. For example, in some embodiments, the data analytics platform may receive data captured by a meteorological ("MET") tower installed at the given wind site, which may provide an indication of wind conditions at the given wind site (e.g., wind speed, wind directions), etc. As another example, the data analytics platform may receive weather data for the given wind site from a weather-data provider. As yet another example, the data analytics platform may receive maintenance data for the wind turbines at the given wind site. As still another example, the data analytics platform may receive image data (e.g., satellite image data, photographic image data, and/or video image data) that provides a visual indication of the orientation of the one or more wind turbines at the given wind site. The data analytics platform may receive other data related to the operation of the given wind site as well.

In accordance with the present disclosure, a data analytics platform may then be configured to help determine the nacelle orientation of one or more wind turbines located at a given wind site based on wind-turbine data and/or other data related to the operation of the given wind site.

According to example embodiments of the disclosed approach, the data analytics platform may begin by obtaining reference data provided by a reference source that is indicative of an expected orientation of at least one given wind turbine at a given wind site (which may also be referred to as the "source of truth" or "ground truth" for the given wind turbine at the given wind site). The reference source may take various forms.

In one embodiment, the reference source may be a device that is capable of capturing reliable and accurate measurements of the wind conditions experienced by the at least one given wind turbine at the given wind site. For example, the reference source may be a MET tower at the given wind site that is configured to measure the conditions of the wind at the given wind site, such as the wind direction and wind speed. As another example, the reference source may be one of the wind turbines at the given wind site that is known to be reporting its nacelle orientation (and thus the wind direction) accurately. For instance, if one of the wind turbines at the given wind site has been precisely calibrated to report nacelle orientation accurately, that wind turbine may be used as the reference source. Other examples may be possible as well.

In another embodiment, the reference source may be an image data source that provides image data comprising a visual indication of the orientation of the at least one given wind turbine at the given wind site. This image data may be captured by various image-capture systems, examples of which may include a satellite, a drone, a balloon, a sensor-based image-capture system, among others. In this respect, the reference source could comprise the image-capture system itself, or may comprise another system that maintains image data captured by the image-capture system (e.g., an image-data server). Further, this image data may take various forms, examples of which may include satellite image data, photographic image data, and/or video image data, as examples. Additionally, each snapshot of image data may include or be associated with a timestamp or the like that indicates a time at which the snapshot of image data was captured (i.e., an image-capture time). Additionally yet, each snapshot of image data may include or be associated with other metadata, an example of which may include location data for the given wind site and/or the wind turbines that are the subject of the image.

The reference source, and the reference data provided by the reference source, may take other forms as well.

Further, the data analytics platform may identify the reference source for the at least one given wind turbine in various manners. In one example, the data analytics platform may identify the reference source for the at least one given wind turbine based on a user input at the data analytics platform, which may be received via a user interface at the data analytics platform or via a client station, and may be stored for future retrieval. In another example, the data analytics platform may identify the reference source for the at least one given wind turbine based on data received from another system or entity in communication with the data analytics platform (e.g., a server at the wind site that has a stored table comprising associations between wind turbines and reference sources). In this example, the server may send the table to the data analytics platform, which may in turn store the table for future reference. In still another example, the data analytics platform may identify the reference source based the data analytics platform's analysis of data relating to the given wind site. For instance, in this example, the data analytics platform may evaluate location data and/or historical wind data for the wind turbines at the given wind site as compared to the same data for possible reference sources (i.e., reference sources that are known to provide reliable and/or accurate wind data) in order to identify the best reference source for each wind turbine.

Further yet, the data analytics platform may identify a reference source at different levels of turbine granularity, e.g., the data analytics platform may identify a reference source for different levels of groupings of wind turbines. As one example, the data analytics platform may identify a reference source at a turbine level, i.e., on a turbine-by-turbine basis. As another example, the data analytics platform may identify a reference source at the level of a cluster or group of turbines, i.e., on a cluster-by-cluster basis. The data analytics platform may identify a reference source on various other levels of granularity as well. The identification of the reference source at a given level of granularity may take the form any of the above-described techniques for identifying a reference source.

The data analytics platform may identify the reference source for the at least one given wind turbine at the given wind site in various other manners as well.

After the data analytics platform obtains reference data provided by the reference source that is indicative of an expected orientation of the at least one given wind turbine at one or more past times, the data analytics platform may then use the obtained reference data to determine the expected orientation of the given wind turbine at each of the one or more past times. The data analytics platform may use the reference data to determine the expected orientation of the given wind turbine in various manners.

As discussed above, in one embodiment, the reference source may take the form of a device that captures data indicating wind conditions experienced by the given wind turbine at one or more past times (i.e., historical wind-conditions data). In such an embodiment, the data analytics platform may determine the expected orientation of the given wind turbine at each of the one or more past times based on the historical wind-conditions data provided by such a reference source by (a) identifying one or more past windows of time during which wind conditions experienced by the given wind turbine (as indicated by the reference source) meet threshold criteria that indicate relatively reliable wind conditions at the given wind turbine (which may be evaluated in terms of wind speed magnitude, wind direction variability, wind speed variability, etc.), and then (b) based on the wind conditions experienced by the given wind turbine during each identified past window of time, determine the expected orientation of the given wind turbine during each identified past window of time.

The data analytics platform may obtain the historical wind-conditions data for the given wind turbine in various manners. In one example, the data analytics platform may be configured to periodically receive and store historical wind-conditions data from the reference source (e.g., according to a schedule or in response to certain triggering events), in which case the data analytics platform may obtain the historical wind-conditions data from this previously-stored historical wind-conditions for the reference source. As another example, the data analytics platform may not have any previously-stored historical wind-conditions data from the reference source, in which case the data analytics platform may be configured to request historical wind-conditions data from the reference source prior to beginning the evaluation. Other examples are possible as well.

Further, the historical wind-conditions data that is obtained by the data analytics platform may take various forms. In one implementation, the historical wind-conditions data may include values captured by the reference source for a given set of wind variables (e.g., wind direction, wind speed, etc.) over a given period of time in the past (e.g., 1 year). In this respect, the historical wind-conditions data may include all of the values captured by the reference source for the given set of variables over the given period of time in the past, or may only include a subset of those values. For example, while a reference source such as a MET tower may capture values for the set of wind variables as frequently as every 1-2 minutes, the data analytics platform may only evaluate a subset of these values (e.g., every $2^{nd}$, $5^{th}$, $10^{th}$, etc. value). The historical wind-conditions data may also include or be associated with an identifier of the given reference source. The historical wind-conditions data may take other forms as well.

Further yet, the threshold criteria that is applied to the historical wind-conditions data reported by the reference source may also take various forms. In one possible implementation, the threshold criteria may require a window of time lasting at least a threshold length of time during which (1) the wind speed magnitude remains above a minimum wind speed magnitude, (2) the wind direction variability (e.g. one or more measures related to wind direction, such as median, mean, mode, variance, standard deviation, etc.) remains below a threshold amount of wind direction variability (e.g., one standard deviation), and (3) the wind speed variability (e.g. one or more measures related to wind speed, such as median, mean, mode, variance, standard deviation, etc.) also remains below a threshold amount of wind speed variability. In other possible implementations, the threshold criteria may only include a requirement for one of these wind variables (e.g., either wind direction variability or wind speed variability, but not both).

In some implementations, the data analytics platform may also evaluate other metrics to verify that the past windows of time in the set satisfy the threshold criteria. As one possible example, after the data analytics platform identifies a given window of time during which the wind conditions experienced by the at least one given wind turbine meet the threshold criteria, the data analytics platform may evaluate the reported nacelle orientation of each wind turbine associated with the reference source (e.g., each wind turbine at the given wind site) during the given window of time to verify that the reported nacelle orientations remained relatively steady during the given window of time (e.g., that the nacelle orientation of each such turbine had a variation that falls below a threshold variation).

In practice, the data analytics platform may identify the entire set of past windows of time that meet the threshold criteria, or may identify only a subset of the past windows of time that meet the threshold criteria. In this respect, the data analytics platform may select which past windows of time are included in the identified subset in various manners.

As one possibility, after determining the entire set of past windows of time that meet the threshold criteria, the data analytics platform may rank the past windows of time and then use this ranking to select a subset of the windows having the highest ranks (e.g., the top 5 or top 10 windows in the ranking). The ranking of the windows may take various forms and may be based on various factors, such as a combination of wind speed magnitude, wind direction variability, and/or wind speed variability (where variability of a given wind condition may be represented using any of various statistical measures, examples of which may include variance and standard deviation). When performing this ranking, in practice, the data analytics platform may weight the wind metrics differently. For example, the data analytics platform may weight the wind speed magnitude higher than either of the variability measures. As another example, the data analytics platform may weight the wind direction variability and wind speed variability equally, may weight the wind direction variability higher than the wind speed variability, or may weight the wind speed variability higher than the wind direction variability, depending on the implementation.

In one implementation, the data analytics platform may rank past windows of time based on weighted combinations of their wind speed standard deviation and wind direction standard deviation. More particularly, the data analytics platform may rank past windows of time based by weighting the standard deviation of wind speed more heavily than the standard deviation of wind direction owing to the wind direction having a greater range of values (which may range from 0-365 degrees) and therefore variance, as compared to the wind speed values (which may range from e.g., 0-25 meters/sec.). As one instance of this weighting, the data analytics platform may weight two standard deviations of wind direction as much as one standard deviation of wind speed. That is, the data analytics platform may weight the wind direction standard deviation half as much the standard deviation of wind speed. The data analytics platform may weight wind-conditions data, such as wind speed and wind direction in various other manners as well.

The data analytics platform may select which past windows of time are included in the identified subset in various other manners as well.

It should also be understood that, instead of using measured nacelle orientation of wind turbines associated with the reference source as a means of verifying that the past windows of time satisfy the threshold criteria, the measured nacelle orientation of wind turbines associated with the reference source may serve as a basis for one of the threshold criteria. For example, the data analytics platform may evaluate whether the measured nacelle orientation reported by each wind turbine associated with the reference source is within a threshold standard deviation, variance, or range of offsets. The data analytics platform may evaluate whether the measured nacelle orientation remained relatively steady in various other manners as well.

After identifying the one or more past windows of time during which the wind conditions captured by the reference source meet the threshold criteria, the data analytics platform may determine the expected orientation of the given wind turbine during each such past window of time. In general, the data analytics platform may make this determination based on the wind-conditions data reported by the reference source during the past window. For instance, the data analytics platform may determine the expected orientation of the given wind turbine during a given past window of time by determining a representative measure of the wind direction reported by the reference source during the given past window, which may take the form of a mean, median, mode, maximum, minimum, etc. of the wind direction values reported by the reference source over the given past window. Determining the expected orientation of the given wind turbine may take other forms as well.

In an embodiment such as this, where the reference source takes the form of a device that captures data indicating wind conditions experienced by the given wind turbine at one or more past times, the data analytics platform may determine the expected orientation of the given wind turbine at each of the one or more past times in various other manners as well.

As discussed above, in another embodiment, the reference source may be an image data source configured to provide image data comprising a visual indication of the orientation of the at least one given wind turbine at the given wind site, such as satellite image data, photographic image data, and/or video image data. In such an embodiment, the data analytics platform may obtain image data provided by the reference source at one or more past times and then perform an analysis of the image data at each of the one or more past times to determine the expected orientation of the given wind turbine at each of the one or more past times. Such an analysis may take various forms. As one example, the analysis may involve application of a computer-vision technique for determining object orientation in an image, examples of which may include principal component analysis (PCA), histogram template matching, binary connectivity analysis, and ellipse fitting, among others. As another example, the data analytics platform may present the image data for analysis by a human operator, who may then input data indicating an expected orientation for the given wind turbine at each of the one or more past times. It should be understood that the data analytics platform may use the image data to determine the expected orientation of the given wind turbine at each of the one or more past times in various other manners as well.

The data analytics platform may obtain reference data and then use the reference data to determine the expected orientation of the given wind turbine in other manners as well.

In accordance with the present disclosure, the data analytics platform may also obtain measurement data that is indicative of a measured orientation of the given wind turbine at each of the one or more past times. The data analytics platform may obtain this measurement data in various manners. As one example, the data analytics platform may receive this measurement data from the given wind turbine (e.g., as part of the wind-turbine data received from the given wind turbine). As another example, the data analytics platform may receive this measurement data from an intermediate device that sits between the data analytics platform and the given wind turbine. The data analytics platform may obtain this measurement data in other manners as well.

After the data analytics platform obtains the measurement data that is indicative of the measured orientation of the given wind turbine at the one or more past times, the data analytics platform may then use the obtained measurement data to determine the measured orientation of the given wind turbine at each of the one or more past times. The data analytics platform may perform this function in various manners.

As discussed above, in one embodiment, the one or more past times may comprise one or more past windows of time during which the wind conditions experienced by the given wind turbine (as indicated by the reference source) meet threshold criteria. In such an embodiment, the data analytics platform may determine the measured orientation of the given wind turbine during each such past window of time. For instance, the data analytics platform may determine the measured orientation of the given wind turbine during a given past window of time by determining a representative measure of the given wind turbine's measured nacelle orientation during the given past window of time, which may take the form of a mean, median, mode, maximum, minimum, etc. of the nacelle orientation values reported by the given wind turbine over the given past window of time.

In another embodiment, the one or more past times may comprise one or more past points in time during which image data was captured for the given wind turbine (i.e., one or more image-capture times). In such an embodiment, the data analytics platform may determine the measured orientation of the given wind turbine at each such point in time based on the one or more nacelle orientation values reported by the given wind turbine at or around the image-capture time. For example, the data analytics platform may determine the measured orientation of the given wind turbine at a given image-capture time to be whichever orientation value reported by the given wind turbine has a measurement time that is closest to the given image-capture time. As another example, the data analytics platform may determine the measured orientation of the given wind turbine at a given image-capture time to be a representative measure of two or more orientation values reported by the given wind turbine having measurement times that are closest to the given image-capture time. Other examples are possible as well.

Once the data analytics platform has determined the expected and measured orientation of the given wind turbine at each of the one or more past times, the data analytics platform may (1) compare the expected orientation of the given wind turbine to the measured orientation of the given wind turbine at each of the one or more past times and then (2) based on the comparison at each of the one or more past times, determine an orientation offset for the given wind turbine. The data analytics platform may carry out these functions in various manners.

In one implementation, the comparison of the expected orientation of the given wind turbine to the measured orientation of the given wind turbine at each of the one or more past times may involve the data analytics platform determining a respective difference (or "offset value") between the expected orientation of the given wind turbine and the measured orientation of the given wind turbine at each of the one or more past times, thereby resulting in a set of one or more offset values for the given wind turbine that correspond to the one or more past times. In turn, the data analytics platform may use this set of one or more offset values to determine an overall orientation offset for the given wind turbine. The data analytics platform may perform this function in various manners.

As one example, the data analytics platform may first evaluate the set of one or more offset values for the given wind turbine to verify that the above process resulted in offset values for the given turbine that are relatively consistent and/or identify any outliers (e.g., offset values that appear to be associated with past times during which the given wind turbine was not operational or was operating abnormally). For example, the data analytics platform may identify and remove "outlier" offset values that fall outside of a certain range of offset values (e.g., a range of standard deviations or given quartiles) or otherwise fail to meet certain threshold criteria. The data analytics platform may identify and remove "outlier" offset values in various other manners as well.

After excluding any "outlier" offset values from the set, the data analytics platform may use the remaining one or more offset values in the set to determine a representative offset value for the given wind turbine, such as by determining the mean, median, mode, maximum, minimum, etc. of the remaining offset values in the set. This representative offset value may then be used as the orientation offset for the given wind turbine.

While the process above is described in the context of a single wind turbine, it should be understood that the data analytics platform may carry out a similar process to determine a respective orientation offset for each of one or more other wind turbines at the given wind site as well. In this respect, the reference source for the one or more other wind turbines may be the same as or different from the reference source for the given wind turbine. The process for determining the orientation offset for a given wind turbine may take various other forms as well.

Once the orientation offset for the given wind turbine is determined, the data analytics platform may then cause that orientation offset for the given wind turbine to be applied to the nacelle orientations reported by the given wind turbine, thereby resulting in nacelle orientation measurements that reflect the orientation of the given wind turbine's nacelle according to a standardized reference direction, such as true north. The data analytics platform may perform this function in various manners.

In one implementation, the data analytics platform may send the orientation offset to the given wind turbine (either directly or via one or more intermediary devices) along with an instruction for the given wind turbine to apply the orientation offset to its measured orientation before reporting its nacelle orientation.

In another implementation, the data analytics platform may apply the orientation offset after receiving the reported nacelle orientation from the given wind turbine. In practice, the data analytics platform may perform this function by (1) maintaining an association between a given wind turbine and its determined orientation offset, and then (2) responsive to receiving an orientation value for that given wind turbine, applying the determined orientation offset to the given turbine's reported orientation value to produce a resulting nacelle orientation measurement that accurately reflects the orientation of the given turbine's nacelle relative to standardized reference direction such as true north. Other examples are possible as well.

Advantageously, the updated nacelle orientation measurements resulting from the disclosed process may then be used for various purposes. As one example, because the updated nacelle orientation measurements resulting from the disclosed process are represented according to a standardized frame of reference, the nacelle orientation measurements for different wind turbines may then be used to train and/or execute predictive models related to the operation of wind turbines. As another example, the updated nacelle orientation measurements resulting from the disclosed process may be used to build more accurate per-turbine power rose diagrams. As yet another example, the updated nacelle orientation measurements resulting from the disclosed process may help the data analytics platform in identifying wind turbines that are being "shadowed" (i.e. caught in the turbulent wake of another, upwind wind turbine). As still another example, the updated nacelle orientation measurements may aide the data analytics platform in identifying wind turbines having nacelle orientation issues or other control system issues. For instance, the data analytics platform may determine, based on a given wind turbine's nacelle orientation measurements, that a given wind turbine is not rotating its nacelle as much as other wind turbines that are experiencing similar wind conditions, and based on this determination, may determine that there is a problem with the given wind turbine's control systems, such as a failing motor or other control system.

Accordingly, in one aspect, disclosed herein is a method that involves (a) obtaining reference data provided by a reference source that is indicative of an expected orientation of a given wind turbine at one or more past times, (b) using the reference data to determine the expected orientation of the given wind turbine at each of the one or more past times, (c) obtaining measurement data that is indicative of a measured orientation of the given wind turbine at each of the one or more past times, (d) using the measurement data to determine the measured orientation of the given wind turbine at each of the one or more past times, (e) comparing, at each of the one or more past times, the expected orientation of the given wind turbine to the measured orientation of the given wind turbine, (f) based on the comparison at each of the one or more past times, determine an orientation offset for the given wind turbine, and (g) causing the orientation offset for the given wind turbine to be applied to at least one nacelle orientation reported by the given wind turbine.

In another aspect, disclosed herein is a computing system comprising a network interface, at least one processor, a non-transitory computer-readable medium, and program instructions stored on the non-transitory computer-readable medium that are executable by the at least one processor to cause the computing system to carry out the functions disclosed herein associated with determining an orientation of a wind turbine nacelle.

In yet another aspect, disclosed herein is a non-transitory computer-readable medium having instructions stored thereon that are executable to cause a computing system to carry out the functions disclosed herein associated with determining an orientation of a wind turbine nacelle.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
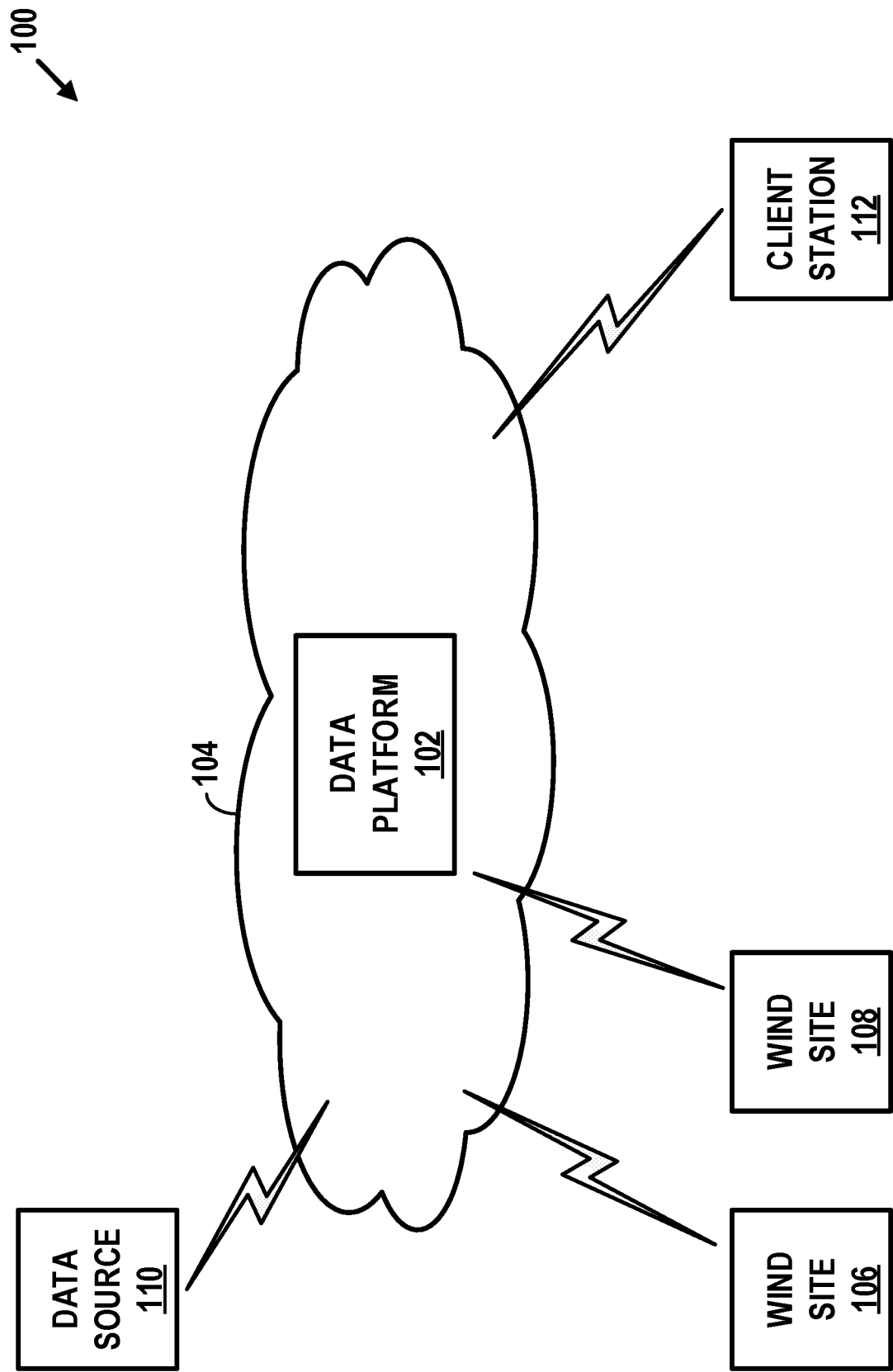
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as a data platform (sometimes referred to herein as a "data analytics platform" or a "condition-monitoring system"), which may communicate via a communication network 104 with one or more wind sites, such as representative wind sites 106 and 108, one or more data sources, such as representative data source 110, and one or more output systems, such as representative client station 112. As discussed in further detail, each wind site 106 and 108 may include one or more wind turbines that provide electricity to a power grid. It should be understood that the network configuration 100 may include various other systems as well.

Broadly speaking, the data platform 102 may take the form of one or more computer systems that are configured to receive, ingest, process, analyze, and/or provide access to wind-turbine data. For instance, the data platform 102 may include one or more servers (or the like) having hardware components and software components that are configured to carry out one or more of the functions disclosed herein for receiving, ingesting, processing, analyzing, and/or providing access to wind-turbine data and other data. Additionally, the data platform 102 may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the data platform 102 may be arranged to receive and transmit data according to dataflow technology, such as TPL Dataflow or NiFi, among other examples. The platform may take other forms as well. The data platform 102 is discussed in further detail below with reference to FIGS. 4-5.

As shown in FIG. 1, the data platform 102 may be configured to communicate, via the communication network 104, with the one or more wind sites, data sources, and/or output systems in the network configuration 100. For example, the data platform 102 may receive wind-turbine data, via the communication network 104, that is sent by one or more wind turbines or wind-site control centers and/or data sources 110. As another example, the data platform 102 may transmit wind-turbine data and/or commands, via the communication network 104, for receipt by an output system, such as a client station, a work-order system, a parts-ordering system, etc. The data platform 102 may engage in other types of communication via the communication network 104 as well.

In general, the communication network 104 may include one or more computing systems and network infrastructure configured to facilitate transferring data between the data platform 102 and the one or more wind sites, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the data platform 102 and the one or more wind sites, data sources, and/or output systems may include one or more intermediate systems. For example, the one or more wind sites and/or data sources may send wind turbine attribute data to one or more intermediary systems, such as a wind turbine gateway or an organization's existing platform (not shown), and the data platform 102 may then be configured to receive the wind turbine attribute data from the one or more intermediary systems. As another example, the data platform 102 may communicate with an output system via one or more intermediary systems, such as a host server (not shown). Many other configurations are also possible.

In general, the wind sites 106 and 108 each include one or more wind turbines that convert wind energy into electricity that is provided to a power grid. As discussed in further detail below, each wind site provides to the data platform 102 wind-turbine data for the one or more wind turbines within the given wind site (e.g., data indicative of a wind turbine's operation, electricity production, configuration, and/or meteorological conditions). The data platform 102 is configured to define predictive models based on such data, perform predictive analytics on behalf of the wind turbines, and/or determine orientations of the wind turbine nacelles relative to a standardized frame of reference. Exemplary wind sites and wind turbines are discussed in detail below with reference to FIG. 2 and FIG. 3, respectively.

In general, the data source 110 may be or include one or more computing systems configured to collect, store, and/or provide data that is related to wind turbines, which may be referred to as "wind-turbine data," or other data that is otherwise relevant to the functions performed by the data platform 102. For example, the data source 110 may collect and provide wind turbine attribute data that originates from wind sites or wind turbines (e.g., historical wind turbine operating data and/or historical environmental data corresponding thereto), in which case the data source 110 may serve as an alternative source for such wind turbine attribute data. As another example, the data source 110 may be configured to provide data that does not originate from wind sites or wind turbines (e.g., image data, weather data, and/or other environmental data), which may be referred to herein as "other data." Such a data source may take various forms.

In one implementation, the data source 110 could take the form of an image data source that is configured to provide image data for a wind site. This image data may take various forms, examples of which include satellite image data, photographic image data, video image data, and/or remotely-sensed image data, among other examples. Further, this image data may be captured by various image-capture systems, examples of which may include a satellite, a drone, a balloon, a sensor-based image-capture system, among others.

In another implementation, the data source 110 could take the form of a location data source that is configured to provide location data for wind turbines at a wind site. This location data may take various forms, an example of which includes GPS coordinates.

In yet another implementation, the data source 110 could take the form of an environmental data source that is configured to provide data indicating some characteristic of the environment in which wind sites are located, such as weather data source or a topography data source that provide information regarding natural and artificial features of a given area, among other examples.

In still another implementation, the data source 110 could take the form of a turbine-management data source that provides data indicating events or statuses of entities (e.g., other assets) that may affect the operation or maintenance of wind turbines (e.g., when a wind turbine may receive maintenance). Examples of turbine-management data sources include turbine-maintenance servers that provide information regarding inspections, maintenance, services, and/or repairs that have been performed and/or are scheduled to be performed on turbines, power-grid servers that provide information reflecting times and/or dates of electricity consumption and/or power demand, part-supplier servers that provide information regarding parts that particular suppliers have in stock and prices thereof, and fluid-analysis servers that provide information regarding the results of analyses of wind turbine fluids, among other examples. One of ordinary skill in the art will appreciate that these are but a few examples of data sources and that numerous others are possible.

The data platform 102 may receive data from the data source 110 in various manners. According to one example, the data platform 102 may be configured to periodically request and receive data from the data source 110. In another example, the data platform 102 may receive data from the data source 110 by "subscribing" to a service provided by the data source. The data platform 102 may receive data from the data source 110 in other manners as well.

The client station 112 may take the form of a computing system or device configured to access and enable a user to interact with the data platform 102. To facilitate this, the client station may include hardware components such as a user interface, a network interface, a processor, and data storage, among other components. Additionally, the client station may be configured with software components that enable interaction with the data platform 102 via a graphical user interface or the like, such as a web browser that is capable of accessing a web application provided by the data platform 102 or a native client application associated with the data platform 102, among other examples. Representative examples of client stations may include a desktop computer, a laptop, a netbook, a tablet, a smartphone, a personal digital assistant (PDA), or any other such device now known or later developed.

Other examples of output systems may include a work-order system configured to output a request for a mechanic or the like to repair a wind turbine or a parts-ordering system configured to place an order for a part of a wind turbine and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. EXAMPLE WIND SITE

Figure 2:
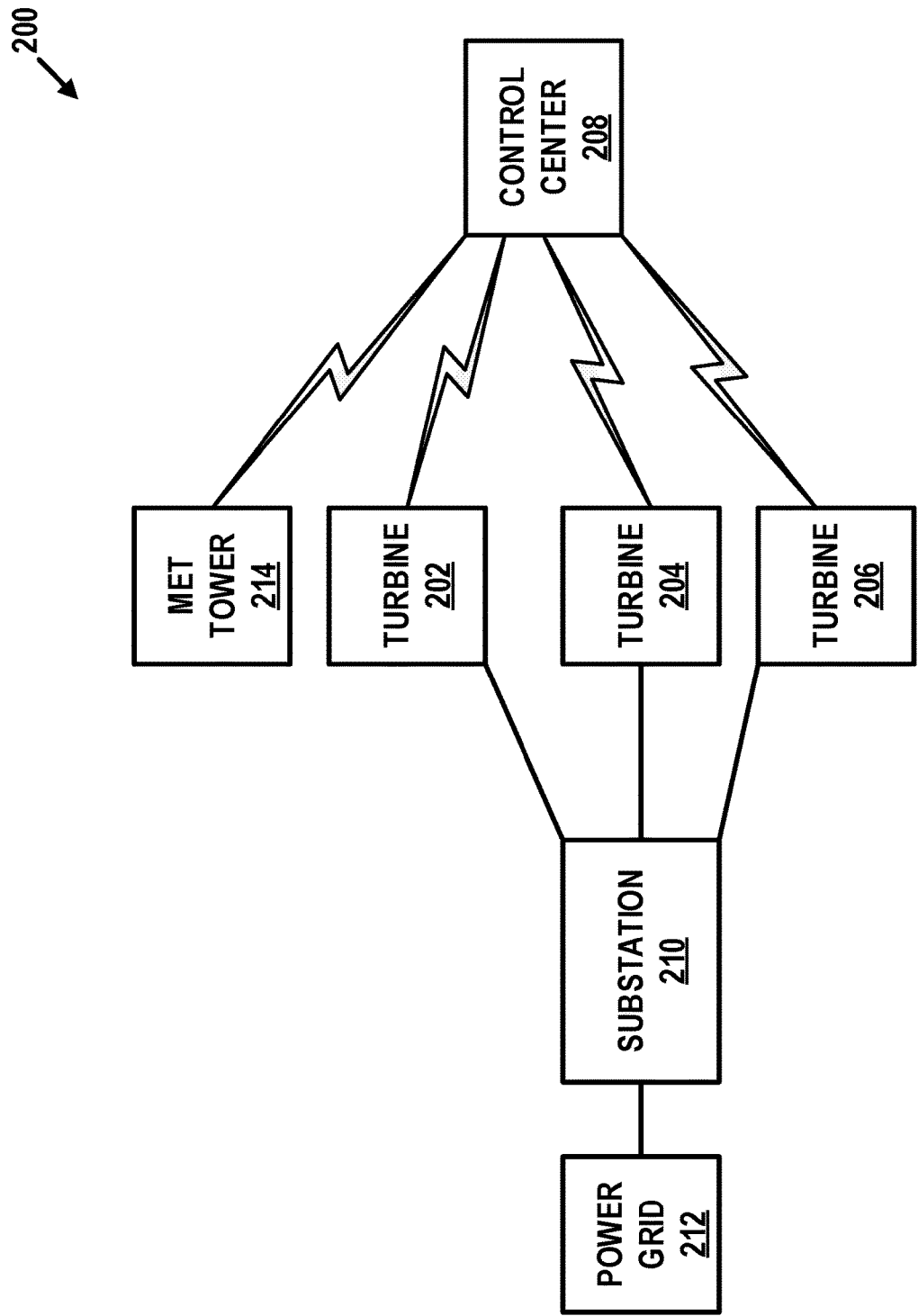
FIG. 2 depicts a simplified block diagram of an example wind site coupled to a power grid.

Turning to FIG. 2, a simplified block diagram of an example wind site 200 that is coupled to a power grid is depicted. Either or both of the wind sites 106 and 108 from FIG. 1 may be configured like the wind site 200. As shown in FIG. 2, the wind site 200 may include one or more wind turbines 202, 204, and 206, at least one control center 208, at least one substation 210, and at least one MET tower 214. The wind site 200 may be coupled to a power grid 212 via the substation 210. It should be understood that the wind site 200 may include additional components not shown and/or more or less of the depicted components. For instance, in example embodiments, the wind site 200 may include multiple control centers or may not include a MET tower. Other examples wind site configurations are also possible.

Generally, each wind turbine 202-206 is configured to convert wind energy into electricity that is provided to the substation 210 via a wired connection, such as a transmission line. The substation 210 in turn provides that electricity to the power grid 212. Wind turbines are discussed in further detail below with reference to FIG. 3.

In practice, the wind site 200 may be distributed across a geographical area that includes a uniform or variable topography. Moreover, the geographical area may be of a size such that environmental conditions may vary across the geographical area. For example, some portion of the geographical area may experience wind patterns, wind speeds, temperature, humidity, etc. that differs from other portions of the geographical area. Accordingly, at any given point in time, some of the wind turbines 202-206 of the wind site 200 may experience one or more environmental conditions in a different manner than other wind turbines, which may result in one wind turbine degrading faster or slower than other wind turbines.

In general, the control center 208 may be configured to manage the operation of the wind turbines 202-206. For example, the control center 208 may be configured to send commands that cause certain wind turbines to activate or deactivate (i.e., attempt to capture wind energy or not). To facilitate this and other functions of the control center 208, the control center 208 may include hardware components such as a user interface, one or more network interfaces, one or more processors, and data storage, among other components. In example embodiments, the one or more processors may take the form of a general- or special-purpose processor and in particular, the one or more processors may be or include microprocessors, microcontrollers, application specific integrated circuits, digital signal processors, and the like. In turn, the data storage may be or include one or more non-transitory computer-readable storage media, such as optical, magnetic, organic, or flash memory, among other examples.

The control center 208 may be communicatively coupled to the wind turbines 202-206 via a wireless or wired network, or a combination thereof. The control center 208 may use such a network to collect wind-turbine data from some or all of the wind turbines 202-206 and perhaps maintain that data in data storage. Moreover, the control center 208 may be communicatively coupled to one or more data platforms, such as the data platform 102 from FIG. 1, via a wireless and/or wired network, and may provide the one or more data platforms with wind turbine attribute data.

As mentioned before, the substation 210 may be electrically coupled to the wind turbines 202-206 and may be generally configured to collect electricity from the wind turbines and provide that electricity to the power grid 212. To facilitate these operations, the substation 210 may include one or more electricity collection systems, one or more transformers (e.g., one or more step-up transformers), and infrastructure for coupling the substation 210 to the power grid 212, among other components. Moreover, the substation 210 may be configured to provide to the control center 208 electricity-production data for each of the wind turbines 202-206 indicating how much electricity each turbine is generating at any given time.

The power grid 212 may generally include infrastructure for providing electricity to utility companies and/or residents, among other possibilities. To help facilitate this, the power grid 212 may take the form of or include transmission lines configured to carry electricity to particular recipients. The power grid 212 may include additional components as well.

The at least one MET tower 214 may comprise meteorological towers which capture and report wind conditions at the wind site 200. Examples of wind conditions that the at least one MET tower 214 may capture and report may comprise data, such as wind speed, wind directions, temperature, humidity, barometric pressure, etc.

As one example, the reported wind-conditions data may include snapshots of wind-conditions data of a given set of wind variables (e.g., wind directions, wind speed, etc.) taken by the at least one MET tower 214 at various different times in the past. As an example, a given snapshot of wind-conditions data may include an identifier of the reference source (e.g., "met1"), an indicator of the measurement time (e.g., "22:02:30"), and an indication of a measured value for each of one or more wind variables (e.g., a wind direction of "30 degrees Northwest," a wind speed of 8 mph, etc.). The at least one MET tower 214 may report wind-conditions data at a frequency of 1-2 times per minute, as one example. The wind-conditions data captured and reported by the at least one MET tower 214 may take various other forms and may be reported at various other frequencies as well.

In one implementation, the wind turbines 202-206 at the wind site 200 may be configured to individually send wind-turbine data indicating the wind turbine's operating conditions and/or surrounding environmental conditions to a data analytics platform (e.g., a data analytics platform implemented in a IAN), such as the data platform 102. In another implementation, the wind turbines 202-206 at the wind site 200 may be configured send wind-turbine data indicating the wind turbine's operating conditions and/or surrounding environmental conditions to the control center 208 for the wind site 200, which may be configured to aggregate the data received from the wind turbines 202-206, and then send this wind-turbine data to a remote data analytics platform, e.g. the data platform 102. In yet another implementation, the wind turbines 202-206 at the given wind site 200 may be configured send data indicating the wind turbine's operating conditions and/or surrounding environmental conditions to the control center 208 for the wind site 200, but the control center 208 may be configured to operate as a local data analytics platform such that the wind-turbine data need not be sent to a remote data analytics platform. The wind-turbine data for the given wind site may be provided to the data analytics system in other manners as well.

In addition to receiving this wind-turbine data for the given wind site, the data platform 102 platform may also receive other data related to the operation of the wind site 200. For example, the data platform 102 may receive data captured by MET tower 214 installed at the wind site 200, which may provide an indication of wind conditions at the wind site 200 (e.g., wind speed, wind directions), etc. As another example, the data platform 102 may receive weather data for the wind site 200 from a weather-data provider. As yet another example, the data platform 102 may receive maintenance data for the wind turbines 202-206 at the wind site 200. The data platform 102 may receive other data related to the operation of the wind site 200 as well as well.

As described above, the wind site 200 may experience environmental conditions, e.g. wind conditions, that vary across the geographical area of the wind site 200. It should be understood that MET towers may be installed at various locations within the geographical area of the wind site 200 that experience the differing environmental conditions such that the at least one MET tower 214 may capture and report the differing environmental conditions at some or all of those various locations.

III. EXAMPLE WIND TURBINE

Figure 3:
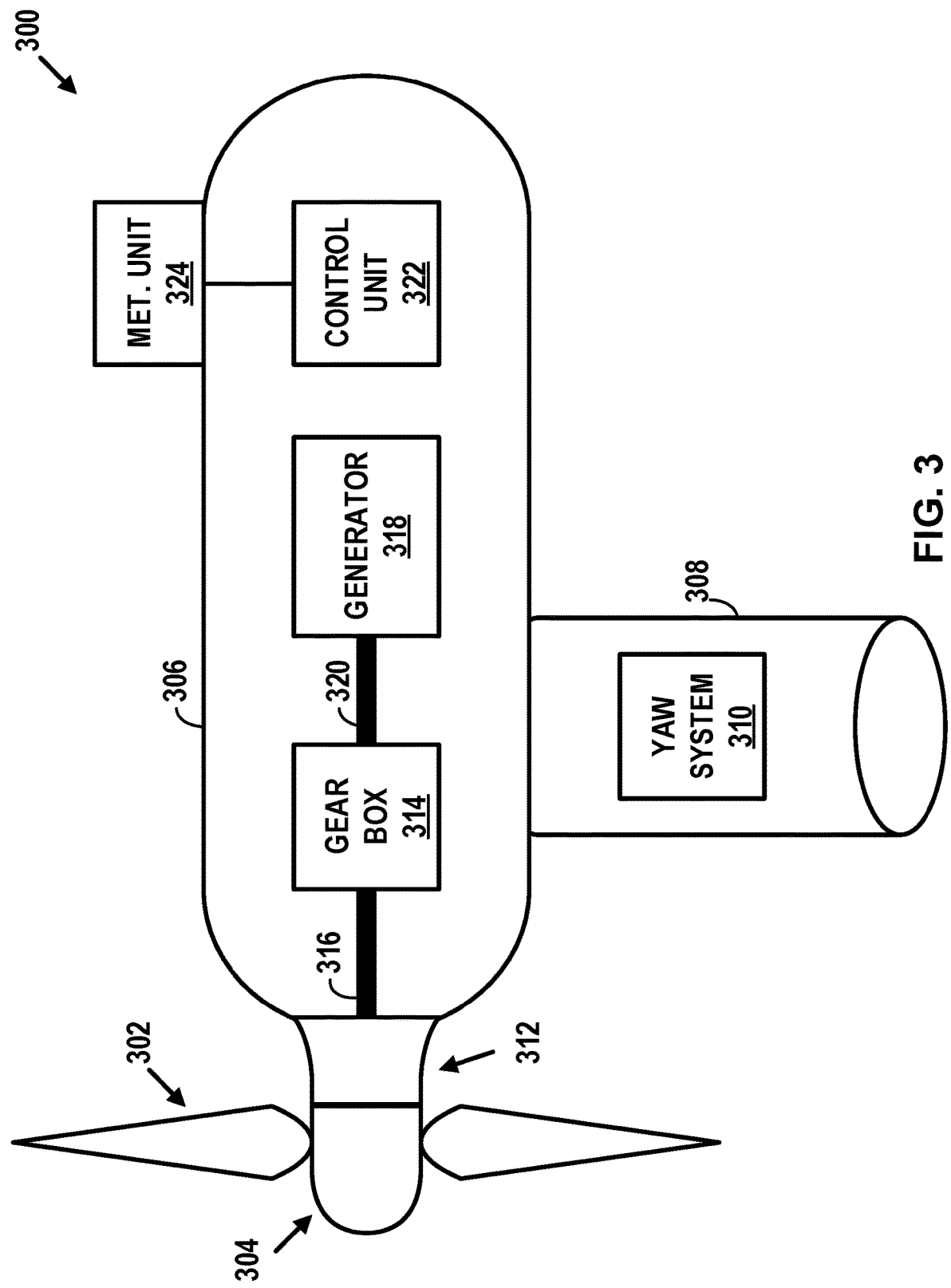
FIG. 3 depicts a simplified diagram of an example wind turbine.

Turning to FIG. 3, a simplified diagram of an example wind turbine 300 is depicted. Some or all of the wind turbines 202-206 from FIG. 2 may be configured like the wind turbine 300. As shown in FIG. 3, the wind turbine 300 includes multiple blades 302 that are mounted to a hub 304 that collectively form a rotor that is configured to rotate as wind passes over the blades 302. The rotor is connected to a nacelle 306 that sits atop a tower 308.

Within the tower 308, a yaw system 310 may be included that is generally configured to control the position of the upper structure of the wind turbine 300 (e.g., the rotor and nacelle 306) to align the upper structure in a desired direction relative to the wind's direction. To help facilitate this, the yaw system 310 may include one or more motors and/or other actuators, drive shafts, gears, and control units, among other components.

The wind turbine 300 may also include a pitch system 312 that may be separate from or part of the hub 304. The pitch system 312 may be generally configured to change the angle of the pitch of the blades 302 to help control the rotational speed of the rotor, and the pitch system 312 may also be configured to activate or deactivate the rotor's ability to rotate (e.g., by engaging or disengaging a brake or the like). To help facilitate these operations, the pitch system 312 may include one or more motors and/or other actuators, drive shafts, brakes, and control units, among other components. The yaw system 310 and pitch system 312 may be referred to collectively herein as the wind turbine's "positioning system."

The wind turbine 300 may include a number of subsystems within or atop of the nacelle 306. As shown in FIG. 3, the hub 304 of the rotor is physically coupled to a gear box 314 via a drive shaft 316, which may take the form of a low-speed drive shaft. The gear box 314 in turn is physically coupled to a generator 318 via a drive shaft 320, which may take the form of a high-speed drive shaft. The generator 318 is configured to generate electricity that travels on a wire (not shown) that extends down the tower 308 to the substation 210 of FIG. 2.

In general, the gear box 314 operates to connect the drive shaft 316 to the drive shaft 320. The gear box 314 may include two or more gears of differing sizes that facilitate causing the drive shaft 320 to rotate at a higher rate than the drive shaft 316. As a result, the drive shaft 320 is configured to rotate at a rate that is sufficient to cause the generator 318 to produce electricity. In some example embodiments, the wind turbine 300 may not include a gear box 314, such as when the generator 318 is a "direct-drive" generator.

As suggested above, the generator 318 is configured to convert mechanical energy into electricity. In particular, the generator 318 is driven by the drive shaft 320 and as the drive shaft 320 spins, converts the mechanical energy of the drive shaft 320 into electricity. The generator 318 may take the form of an induction generator, among other possibilities.

The nacelle 306 also includes a control unit 322 that generally manages the operation of the wind turbine 300. The control unit 322 may include one or more processors (similar in nature to the above-discussed processors) and data storage (similar in nature to the above-discussed data storage) that includes program instructions that when executed by the one or more processors cause the control unit 322 to perform various functions, some of which are described herein. The control unit 322 may be communicatively linked (either directly or indirectly) by a system bus, network, or other connection mechanism to one or more of the wind turbine's subsystems, such as the yaw system 310, the pitch system 312, and/or perhaps other subsystems. Moreover, the control unit 322 may be communicatively coupled to a meteorological unit 324 that sits atop of the nacelle 306 and is configured to measure wind-turbine data (which may, e.g. include wind-conditions data) of the wind turbine's surroundings. The meteorological unit 324 may include a wind vane, an anemometer, and/or a variety of sensors configured to measure a variety of meteorological attributes. The meteorological unit 324 may output meteorological data indicative of measured meteorological attributes, such as wind-conditions data, which the control unit 322 may be configured to maintain in data storage.

As used herein, "wind-turbine data" and "other data" are generally used to indicate the same types of conditions/attributes. However, "other" data may originate from an external data source, such as the data source 110 of FIG. 1, or from a wind site or perhaps even a wind turbine. On the other hand, "wind-turbine" data generally originates from a wind turbine or a meteorological tower and in particular, from the wind turbine's own equipment and sensors, such as from the wind turbine's meteorological unit 324 or from the at least one MET tower 214.

In operation, measured meteorological attributes may cause the control unit 322 to in turn control one or more of the wind turbines subsystems. For example, the meteorological unit 324 may provide the control unit 322 a signal that represents the present wind direction, which may in turn cause the control unit 322 to control the yaw system 310 to pivot the wind turbine a certain number of degrees clockwise to align with the wind direction. As another example, the control unit 322 may receive from the meteorological unit 324 a signal that represents the present wind speed, which may in turn cause the control unit 322 to cause the pitch system 312 to disable the rotor from spinning (e.g., engage a brake) in the event that the wind speed is above a threshold speed. Other example operations are also possible.

The wind turbine 300 may also be outfitted with various sensors that are configured to monitor operating conditions of the wind turbine 300. In some cases, multiple sensors may be grouped based on a particular subsystem of the wind turbine 300. In this way, the group of sensors may be configured to monitor operating conditions of the particular subsystem.

In general, a sensor may be configured to detect a physical property, which may be indicative of one or more operating conditions of the wind turbine 300, and provide a representation, such as an electrical signal, of the detected physical property. In operation, the sensors may be configured to obtain measurements continuously, periodically (e.g., based on a sampling frequency), and/or in response to some triggering event. In some examples, the sensors may be preconfigured with operating parameters for performing measurements and/or may perform measurements in accordance with operating parameters provided by the control unit 322 (e.g., signals that instruct the sensors to obtain measurements). In examples, different sensors may have different operating parameters (e.g., some sensors may sample based on a first frequency, while other sensors sample based on a second, different frequency). In any event, the sensors may be configured to transmit electrical signals representing a measured physical property to the control unit 322 or perhaps a local analytics device if one is present. The sensors may continuously or periodically provide such signals.

For instance, sensors may be configured to measure physical properties such as the measured orientation of the nacelle 306. The control unit 322 may capture the measured orientation of the nacelle 306 periodically, e.g. 1-2 times per minute, as an example. The control unit 322 may report the nacelle's measured orientation to, e.g. the data platform 102, the control center 208, etc. The reported measured nacelle orientation may comprise a number of degrees that the nacelle 306 is offset relative to the direction at which the wind turbine 300 is installed. A reported offset value may range from 0 to 360 degrees, inclusive. As an example, if the turbine 300 is installed facing 45 degrees (i.e., northeast), and the yaw system 310 reports that the nacelle 306 has an offset of 90 degrees, the nacelle may face 135 degrees (45+90 degrees), i.e. southeast.

The sensors of control unit 322 may also report operating conditions of the wind turbine 300, examples of which may include wind speed, wind direction, temperatures, pressures, vibrations, rotational speeds, friction, power usages, fluid levels, runtimes, voltages and currents, magnetic fields, electric fields, positions of components, and power generation, among other examples. At least some of the aforementioned components of the wind turbine 300 may include bearings and/or fluids, such as oils, hydraulic fluids, and/or other lubricating fluids, for which sensors may be provided to measure operating conditions thereof. One of ordinary skill in the art will appreciate that these are but a few example operating conditions that sensors may be configured to measure. Additional or fewer sensors may be used depending on the specific type of wind turbine.

The control unit 322 may be configured to receive respective sensor signals from the sensors and may store sensor data in and later access it from data storage. Additionally, the control unit 322 may be configured to access and/or generate data reflecting the configuration of the wind turbine 300

(e.g., model number, turbine usage, software versions installed, etc.). Moreover, the control 322 may be configured to monitor, store, and later access electricity-production data indicative of how much electricity the wind turbine 300 is generating at a given point in time. The control unit 322 may be configured to provide the control center 208 of FIG. 2 and/or the data platform 102 of FIG. 1 any or all of this wind-turbine data, as well as measured meteorological data. In some embodiments, the control unit 322 may include a wireless network interface that facilitates the control unit 322 transmitting such data wirelessly.

Additionally, the control unit 322 may be configured to modify the rate at which it processes data from the sensors and/or meteorological unit 324, or the control unit 322 may be configured to provide instruction signals that cause them to, for example, modify a sampling rate. Moreover, the control unit 322 may be configured to receive signals from any of the wind turbine 300's subsystems, sensors, and/or the control center 208 of FIG. 2, and based on such signals, cause an operation to occur at the wind turbine 300. Further still, the control unit 322 may be configured to receive signals from a computing device, such as a diagnostic device, that cause the control unit 322 to execute one or more diagnostic tools in accordance with diagnostic rules stored in data storage. Other functionalities of the control unit 322 are also possible, some of which are discussed below.

As one example, the control unit 322 may be configured to "push" data to the data platform 102 either according to a schedule or in response to a triggering event (e.g., a certain amount of data has been collected). As another example, the data platform 102 may be configured to "pull" data from the control unit 322, either according to a schedule or in response to a triggering event. Other examples of the data platform 102 obtaining operating data from a given wind turbine 300 are possible as well, including the possibility that the data platform 102 may receive the data from the wind turbine 300 indirectly via an intermediate entity, such as an entity that is configured to aggregate weather conditions data from various different reference sources and then provide the aggregated data to the data platform 102.

In example embodiments, the wind turbine 300 may also include a local analytics device that may be communicatively coupled to the data platform 102 of FIG. 1 via a network (e.g., a WAN) and configured to provide data (e.g., sensor data) related to the present operation of and/or environmental conditions surrounding the wind turbine 300. The details regarding an exemplary local analytics device can be found in U.S. patent application Ser. No. 14/963,207, which is herein incorporated by reference in its entirety. In some embodiments, the control unit 322 may include or take the form of a local analytics device. In certain embodiments, the wind turbine 300 may provide to data platforms wind turbine related data in other manners.

Although the wind turbine 300 is illustrated as an upwind wind turbine, this is merely for example and explanation purposes only. It should be understood that other wind turbine types, such as downwind wind turbines, could be used instead or as well as the exemplary downwind turbine shown in FIG. 3.

IV. EXAMPLE PLATFORM

Figure 4:
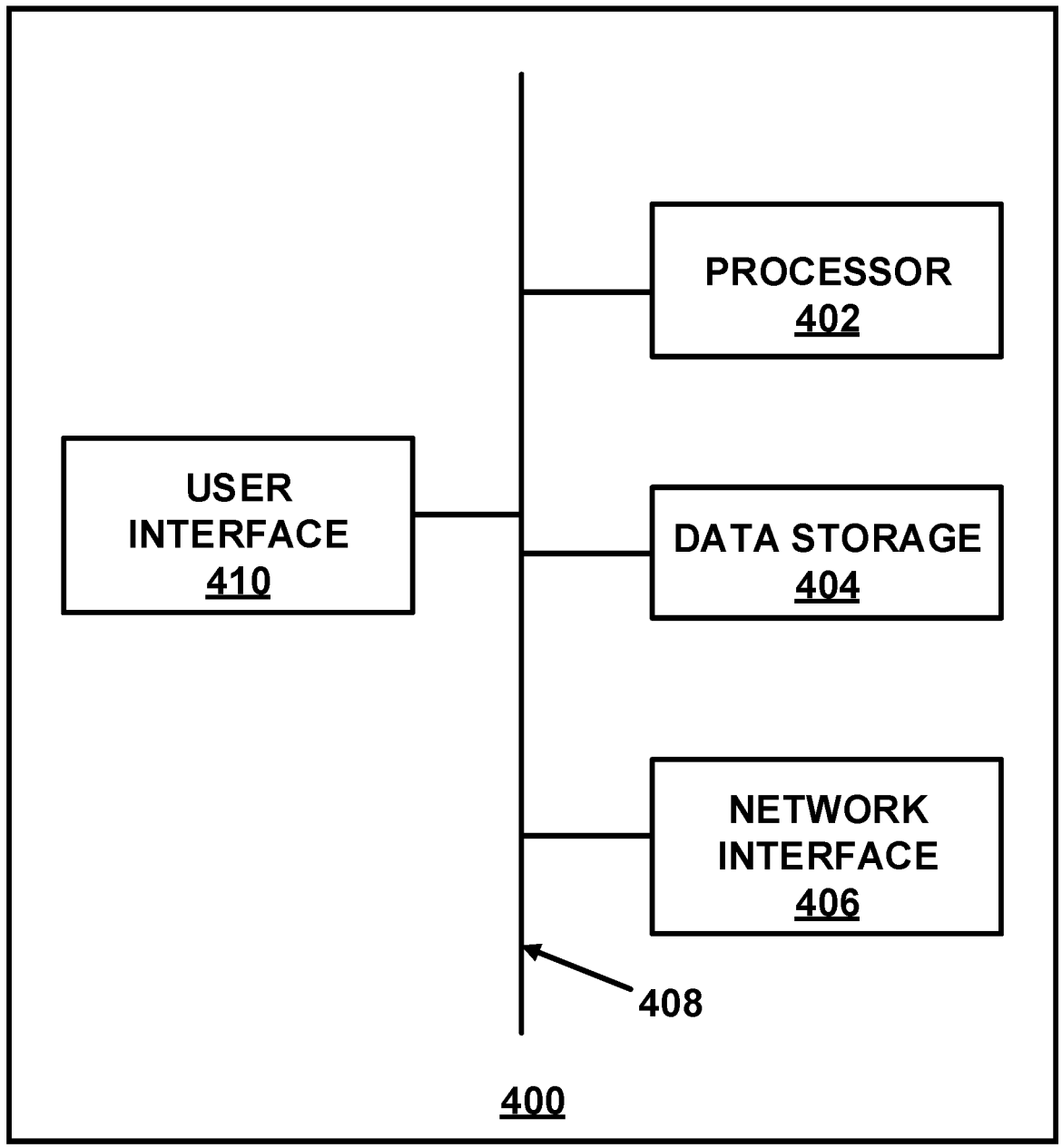
FIG. 4 depicts a structural diagram of an example platform.

FIG. 4 is a simplified block diagram illustrating some components that may be included in an example data platform 400 from a structural perspective. In line with the discussion above, the data platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

The data storage 404 may be provisioned with software components that enable the data platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the data platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the data platform 400 and various network components via the communication network 104, such as the wind sites 106 and 108, the data source 110, and the client station 112. As such, the network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. The network interface 406 may also include multiple network interfaces that support various different types of network connections, some examples of which may include Hadoop, FTP, relational databases, high frequency data such as OSI PI, batch data such as WL, and Base64. Other configurations are possible as well.

The example data platform 400 may also support a user interface 410 that is configured to facilitate user interaction with the data platform 400 and may also be configured to facilitate causing the data platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
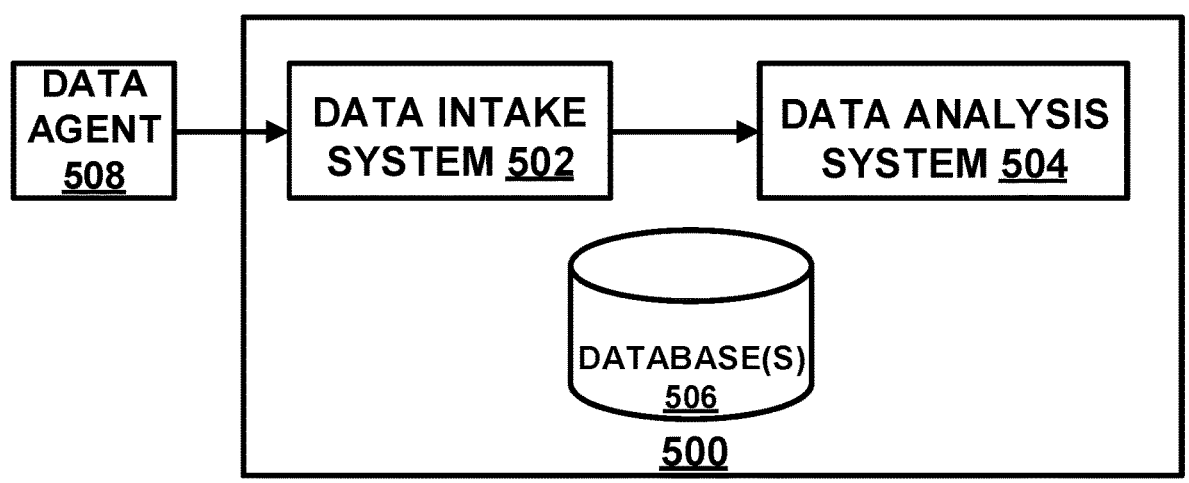
FIG. 5 is a functional block diagram of an example platform.

Referring now to FIG. 5, another simplified block diagram is provided to illustrate some components that may be included in an example data platform 500 from a functional perspective. For instance, as shown, the example data platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive wind turbine attribute data and then provide at least a portion of the received data to the data analysis system 504. As such, the data intake system 502 may be configured to receive wind turbine attribute data from various sources, examples of which may include a wind turbine, a MET tower, a wind site, a wind turbine attribute data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an organization's existing platform/system, an external wind-turbine data source, etc.), that source may be provisioned with a data agent 508. In general, the data agent 508 may be a software component that functions to access wind-turbine data and/or other data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting wind turbine attribute data to the example data platform 500 without the assistance of a data agent.

The data received by the data intake system 502 may take various forms. As one example, the wind-turbine data may include data related to the attributes of a wind turbine in operation, which may originate from the wind turbine itself and/or may include other data from an external source. This wind-turbine data may include wind turbine operating data such as signal data (e.g., sensor data), among other possibilities. Another example of wind-turbine data may include data related to environmental attributes or conditions surrounding a particular wind turbine, such as wind-conditions data, which may originate from the particular wind turbine's meteorological unit.

In addition, the wind-turbine data may also include wind turbine configuration data, such as data indicating the wind turbine's brand, make, model, age, software version, etc. As another example, the wind-turbine data may include certain attributes regarding the origin of the wind-turbine data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each wind turbine, and perhaps to each sensor on the wind turbine, and may be operable to identify the wind turbine and/or sensor from which data originates. These attributes may come in the form of signal signatures or metadata, among other examples. The wind-turbine data received by the data intake system 502 may take other forms as well.

The data intake system 502 may also be configured to perform various pre-processing functions on the wind-turbine data in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received wind turbine attribute data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received wind turbine attribute data in a first type of database (e.g., a time-series or document database) and may store the associated metadata of received wind-turbine data in a second type of database that permit more rapid searching (e.g., a relational database). In such an example, the metadata may then be linked or associated to the wind-turbine data stored in the other database that relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into the following general categories: (1) signal data, (2) event data, (3) environmental data, and (4) wind turbine configuration data. The signal data may generally take the form of raw or aggregated data representing the measurements taken by the sensors at the wind turbines. The event data may generally take the form of data identifying events that relate to wind turbine operation, such as failures, one or more sensor measurements exceeding respective thresholds, inspection events, maintenance events, repair events, fluid events, weather events, or the like. The environmental data may generally take the form of raw or aggregated data representing a measure of one or more environmental conditions surrounding a given wind turbine and may originate from the wind turbine itself (e.g., from the meteorological unit of the wind turbine) or from an external source. And wind turbine configuration data may then include information regarding the configuration of the wind turbine, such as wind turbine identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to wind turbine operation, and the data analysis system 504 may then take certain actions based on the predictive model's output. As still another example, the data analysis system 504 may make certain data available for external access via an API. As yet another example, the data analysis system 504 may use the received data to determine and apply orientation offsets that may be used to determine the orientation of a given wind turbine's nacelle relative to a standardized frame of reference.

In order to facilitate one or more of these functions, the data analysis system 504 may be configured to provide (or "drive") a user interface that can be accessed and displayed by a client station. This user interface may take various forms. As one example, the user interface may be a graphical user interface in the form of a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing wind turbine attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a data platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

V. EXAMPLE OPERATIONS

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein are improved systems, devices, and methods for determining respective nacelle orientation of at least one wind turbine at a given wind site relative to a standardized frame of reference (e.g., a cardinal direction such as true north). These as well as other advantageous may become apparent to a person of ordinary skill in the art upon reading the disclosure set forth herein.

Figure 6:
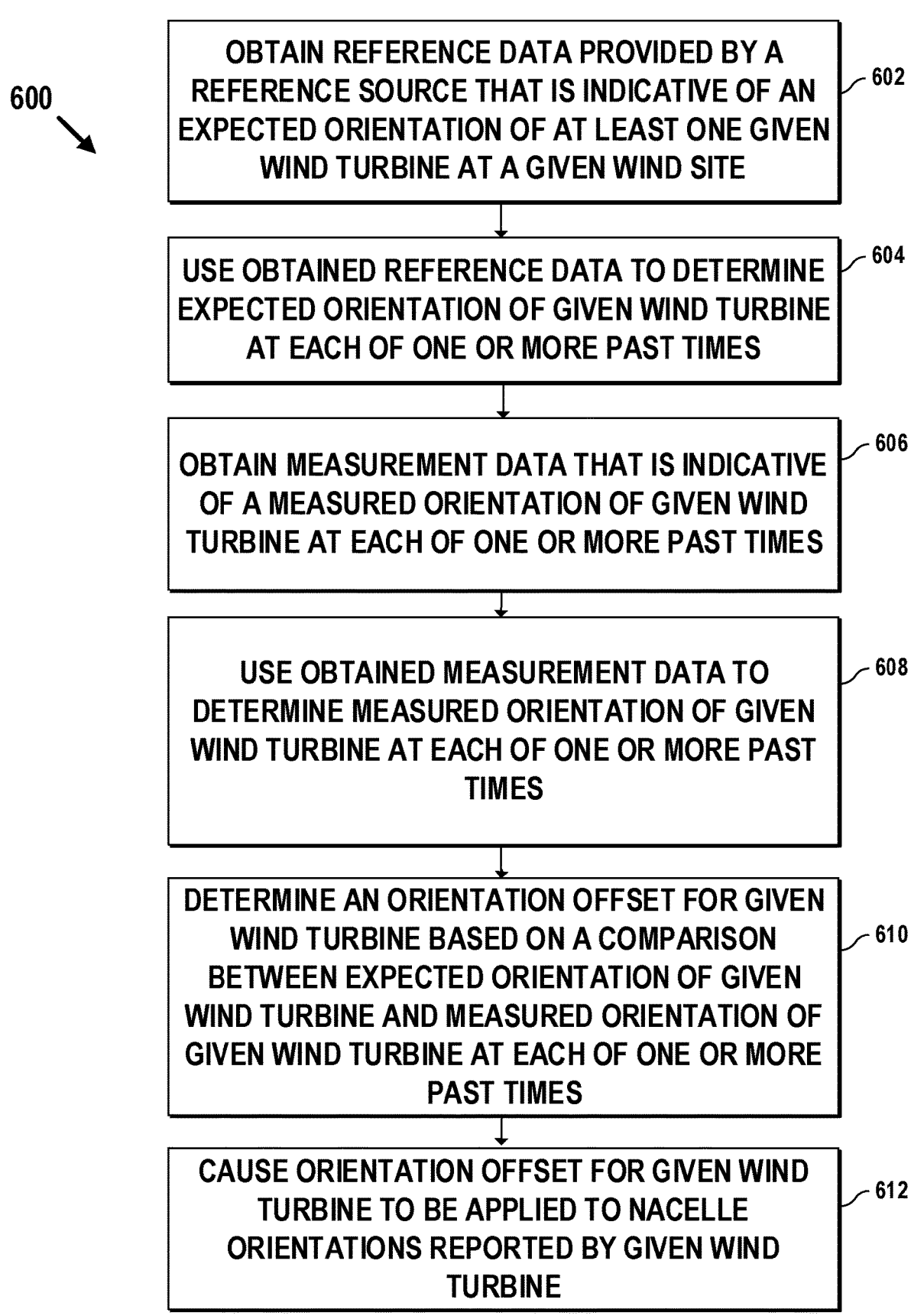
FIG. 6 is a flow diagram of example functions associated with defining an orientation of a wind turbine's nacelle.

FIG. 6 is a flow chart of example functions 600 associated with an example method 600 for determining and then applying an orientation offset for at least one given wind turbine at a given wind site in accordance with example embodiments. For the purposes of explanation, the procedure of FIG. 6 is described as being carried out by the data analytics platform (e.g. the data platform 102), but it could be performed by systems other than the data analytics platform or which work in conjunction with the data analytics platform. One of ordinary skill in the art will appreciate that the flow diagram 600 is provided for sake of clarity and illustration. Numerous other combinations of operations may be utilized in defining offset values for a given wind turbine's nacelle to define the orientation of the wind turbine's nacelle relative to a standardized frame of reference.

As shown in FIG. 6, the example method 600 may begin at block 602 with the data analytics obtaining reference data provided by a reference source that is indicative of an expected orientation of at least one given wind turbine at a given wind site (which may also be referred to as the "source of truth" or "ground truth" for wind conditions at the given wind site) at one or more past times. The reference source may take various forms.

In one implementation, a reference source may be a device that is capable of capturing reliable and accurate measurements of the wind conditions experienced by the at least one given wind turbine at the given wind site. For example, the reference source may be a MET tower at the given wind site that is configured to measure the conditions of the wind at the given wind site, such as the wind direction and wind speed. As another example, the reference source may be one of the wind turbines at the given wind site that is known to be reporting its nacelle orientation (and thus the wind direction) accurately. For instance, if one of the wind turbines at the given wind site has been precisely calibrated to report nacelle orientation accurately, that wind turbine may be used as the reference source. Other examples may be possible as well.

Referring to FIGS. 2-3, the reference source may comprise a MET tower, such as one of the at least one MET tower 214, or the reference source may comprise a MET unit of a wind turbine at the given wind site, such as turbine 202, that is known to report its nacelle orientation accurately.

In another embodiment, the reference source may be an image data source configured to provide image data comprising a visual indication of the orientation of the at least one given wind turbine at the given wind site. This image data may be captured by various image-capture systems, examples of which may include a satellite, a drone, a balloon, a sensor-based image-capture system, among others. In this respect, the reference source could comprise the image-capture system itself, or may comprise another system that maintains image data captured by the image-capture system (e.g., an image-data server such as geospatial satellite image database). Further, this image data may take various forms, examples of which may include satellite image data, photographic image data, and/or video image data, as examples. Additionally, each snapshot of image data may include or be associated with a timestamp or the like that indicates a time at which the snapshot of image data was captured (i.e., an image-capture time). Additionally yet, each snapshot of image data may include or be associated with other metadata, an example of which may include location data for the given wind site and/or the wind turbines that are the subject of the image.

Further, the data analytics platform may identify the reference source for the at least one given wind turbine in various manners. In one example, the data analytics platform may identify the reference source for the at least one given wind turbine based on a user input at the data analytics platform, which may be received via a user interface at the data analytics platform or via a client station, and the identified reference source may be stored for future retrieval. In another example, the data analytics platform may identify the reference source for the at least one given wind turbine based on data received from another system or entity in communication with the data analytics platform (e.g., a server at the wind site that has a stored table comprising associations between win turbines and sources of truth). In this example, the server platform may send the table to the data analytics platform, which may in turn store the table for future reference. In still another example, the data analytics platform may identify the reference source based the data analytics platform's analysis of data relating to a given wind site. For instance, in this example, the data analytics platform may evaluate location data and/or historical wind data for the wind turbines at the given wind site as compared to the same data for possible reference sources (i.e., reference sources that are known to provide reliable and/or accurate wind data) in order to identify out the best reference source for each wind turbine.

Further yet, the data analytics platform may identify a reference source at different levels of turbine granularity, e.g., the data analytics platform may identify a reference source for different levels of groupings of wind turbines. As one example, the data analytics platform may identify a reference source at a turbine level, i.e. on a turbine-by-turbine basis. As another example, the data analytics platform may identify a reference source at the level of a cluster or group of turbines, i.e. on cluster-by-cluster basis. The data analytics platform may identify a reference source on various other levels of granularity as well. The identification of reference sources at a given level of granularity may take the form any of the above-described techniques for identifying reference sources.

The data analytics platform may identify the reference source for the at least one given wind turbine in various other manners as well.

At block 604, after the data analytics platform obtains reference data provided by the reference source that is indicative of an expected orientation of the at least one given wind turbine at one or more past times, the data analytics platform may then use the obtained reference data to determine the expected orientation of the given wind turbine at each of the one or more past times. The data analytics platform may use the reference data to determine the expected orientation of the given wind turbine in various manners.

As discussed above, in one embodiment, the reference source may take the form of a device that captures data indicating wind conditions experienced by the given wind turbine at one or more past times (i.e., historical wind-conditions data). In such an embodiment, the data analytics platform may determine the expected orientation of the given wind turbine at each of the one or more past times based on the historical wind-conditions data provided by such a reference source by (a) identifying one or more past windows of time during which wind conditions experienced by the given wind turbine (as indicated by the reference source) meet threshold criteria that indicate relatively reliable wind conditions at the given wind turbine (which may be evaluated in terms of wind speed magnitude, wind direction variability, wind speed variability, etc.), and then (b) based on the wind conditions experienced by the given wind turbine during each identified past window of time, determine the expected orientation of the given wind turbine during each identified past window of time.

The data analytics platform may obtain the historical win-conditions data for the given wind turbine in various manners. In one example, the data analytics platform may be configured to periodically receive and store historical wind-conditions data from the reference source (e.g., according to a schedule or in response to certain triggering events), in which case the data analytics platform may obtain the historical wind-conditions data from this previously-stored historical wind-conditions for the reference source. As another example, the data analytics platform may not have any previously-stored historical wind-conditions data from the reference source, in which case the data analytics platform may be configured to request historical wind-conditions data from the reference source prior to beginning the evaluation. Other examples are possible as well.

Further, the historical wind-conditions data that is obtained by the data analytics platform may take various forms. In one implementation, the historical wind-conditions data may include values captured by the reference source for a given set of wind variables (e.g., wind direction, wind speed, etc.) over a given period of time in the past (e.g., 1 year). In this respect, the historical wind-conditions data may include all of the values captured by the reference source for the given set of wind variables over the given period of time in the past, or may only include a subset of those values. For example, while a reference source such as a MET tower may capture values for the set of wind variables as frequently as every 1-2 minutes, the data analytics platform may only evaluate a subset of these values (e.g., every $2^{nd}$, $5^{th}$, $10^{th}$, etc. value). The historical wind-conditions data may also include or be associated with an identifier of the given reference source. The historical wind-conditions data may take other forms as well.

After receiving the historical wind-conditions data, the data analytics platform may store such data into data storage for future reference. In some examples, the historical wind-conditions data may be stored along with an associated identifier of the given reference source. In some examples, the data analytics platform may perform some intermediate calculation, such as normalizing the wind speed or wind direction data, or adding a bias offset to the wind speed or wind direction data, etc., before storing the historical data into the data storage.

Further yet, the threshold criteria that is applied to the historical wind-conditions data reported by the reference source may also take various forms. In one possible implementation, the threshold criteria may require a window of time lasting at least a threshold length of time during which (1) the wind speed magnitude remains above a minimum wind speed magnitude, (2) the wind direction variability remains below a threshold amount of wind direction variability (e.g., one standard deviation), and (3) the wind speed variance also remains below a threshold amount of wind speed variability. Variability of a given wind condition may be represented using any of various statistical measures, examples of which may include variance and standard deviation. Variability may take various other forms as well.

For example, the threshold criteria may comprise a window that lasts at least 3 hours during which the wind speed at the reference source remains above 6 meters per second, and the wind speed at the reference source remains below a variability of one standard deviation. Various other implementations of threshold criteria are possible as well. In other possible implementations, the threshold criteria may only include a variable requirement for one of these wind variables (e.g., either wind direction variance or wind speed variability, but not both).

In practice, the data analytics platform may apply this criteria in various manners. As one example, the data analytics platform may apply the threshold criteria sequentially in the order listed above, such that the data analytics platform first identifies a set of one or more past windows of time during which the wind speed reported by the identified reference source remained above a minimum wind speed, then narrows the identified set of one or more past windows of time to those windows of time during which the wind direction reported by the identified reference source remained below a threshold amount of variance, and then further narrows the identified set of one or more past windows to those windows of time during which the wind speed reported by the identified reference source also remained below a threshold amount of variance, thereby resulting in a final set of one or more past windows of time that satisfy the threshold criteria. As another example, the data analytics platform may apply the threshold criteria in parallel such that the application returns one set of one or more past windows of time that satisfy the threshold criteria. For instance, the data analytics platform may apply the minimum wind speed, wind speed variability, and wind direction variance criteria in parallel to determine a final set of one or more past windows of time that satisfy the threshold criteria. Other examples are possible as well.

In some implementations, the data analytics platform may also evaluate other metrics to verify that the past windows of time in the set satisfy the threshold criteria. As one possible example, after the data analytics platform identifies a given window of time during which the wind conditions experienced by the given wind turbine meet the threshold criteria, the data analytics platform may evaluate the reported nacelle orientation of each wind turbine associated with the reference source (e.g., each wind turbine at the given wind site) during the given window of time to verify that the reported nacelle orientations remained relatively steady during the given window of time (e.g., that the nacelle orientation of each such turbine had a variation that falls below a threshold variation).

In practice, the data analytics platform may identify the entire set of past windows of time that meet the threshold criteria, or may identify only a subset of the past windows of time that meet the threshold criteria. In this respect, the data analytics platform may select which past windows of time are included in the identified subset in various manners.

As one possibility, after determining the entire set of past windows of time that meet the threshold criteria, the data analytics platform may rank the past windows of time and then use this ranking to select a subset of the windows having the highest ranks (e.g., the top 5 or top 10 windows in the ranking). The ranking of the windows may take various forms and may be based on various factors, such as a combination of the wind speed magnitude, the wind direction variability, and/or wind speed variability (where variability of a given wind condition may be represented using any of various statistical measures, examples of which may include variance and standard deviation). When performing this ranking, in practice, the data analytics platform may weight the wind metrics differently. For example, the data analytics platform may weight the wind speed magnitude higher than either of the variability metrics. As another example, the data analytics platform may weight the wind direction variability and wind speed variability equally, may weight the wind direction variability higher than the wind speed variability, or may weight the wind speed variability higher than the wind direction variability, depending on the implementation.

In one implementation, the data analytics platform may rank past windows of time based on weighted combinations of their wind speed standard deviation and wind direction standard deviation. More particularly, the data analytics platform may rank past windows of time based by weighting the standard deviation of wind speed more heavily than the standard deviation of wind direction owing to the wind direction having a greater range of values (which may range from 0-365 degrees) and therefore variance, as compared to the wind speed values (which may range from e.g., 0-25 meters/sec.). As one instance of this weighting, the data analytics platform may weight two standard deviations of wind direction as much as one standard deviation of wind speed. That is, the data analytics platform may weight wind direction standard deviation half as much the standard deviation of wind speed. The data analytics platform may weight wind-conditions data, such as wind speed and wind direction in various other manners as well.

In general, to weight the wind speed variability and wind direction variability, the data analytics platform may first normalize the wind speed variability and wind direction variability such that they share a common frame of reference, and may then may then apply the following weighting technique to the normalized wind speed variability and wind direction variability of a given window, which may take the form of:

$$Y=VD*WD+VS*WS,$$

where VD is direction variability, WD is the weight assigned to direction variability, VS is wind speed variability, WS is the weighting assigned to speed variability, and then Y is the output used to rank them, with lower values of Y being ranked higher than higher values of Y. Alternatively, if the data analytics platform uses inverses of variances to calculate Y, then the data analytics platform may rank higher values of Y ahead of lower values of Y. Various other schemes for weighting the wind direction variability and wind speed variability are possible as well.

As one example of the equal weighting, the rankings of the windows of time may be determined based inversely on the sum of the wind speed variance and the wind direction variability. For example, if the wind speed variability for a first given window of time is 0.5, and the wind direction variability for the first given window is 1, the ranking value may be equal to the sum, i.e. 1.5 (0.5+1). If a second window of time has wind speed variability equal to 1, and a wind direction variability equal to 1.5, and a sum equal to 2.5 (i.e. 1+1.5), the data analytics platform may rank the first given window of time ahead of the second window of time due to the first window having a lower sum of wind speed and wind direction variabilities.

As another example of ranking windows using equal weights for the wind speed variability, and the wind direction variability, the data analytics platform may calculate the rankings based on an inverse sum of the variabilities. For instance, given the same first and second windows of time described above, the data analytics platform may calculate a ranking value for the first given window of time as: (1/0.5)+(1/1)=3, and the ranking value for the second given window of time as (1/1)+(1/1.5)=1.66. The data analytics platform may then select the first window of time due to having the highest sum of inverse wind speed and wind direction variabilities.

As still another example, of ranking windows of time using equal weights for wind speed and wind direction variability, the data analytics platform may calculate the rankings for the first and second windows of time based on sums of the squares of the wind speed and wind direction variabilities. For instance, given the same first and second windows of time described above, the data analytics platform may calculate the first weight as $(0.5^2)+(1^2)=1.25$, and the ranking value for the second window of time as $(1^2)+(1.5^2)=3.25$. The data analytics platform may then rank the first window of time ahead of the second window of time due to having a lower sum-total of squared wind speed and wind direction variability values.

The above-described techniques for determining ranking values for windows of time of wind-conditions data are just some examples, and may take various other forms as well. The techniques for determining ranking values for windows of time of wind-conditions data may also be combined with techniques for weighting the wind speed variability and/or wind direction variability in various examples.

The data analytics platform may select which past windows of time are included in the identified subset in various other manners as well.

It should also be understood that, instead of using measured nacelle orientation of wind turbines associated with the reference source as a means to verify that the past windows of time satisfy the threshold criteria, the measured nacelle orientation of the wind turbines associated with the reference source may serve as a basis for one of the threshold criteria. For example, the data analytics platform may evaluate whether the reported nacelle orientation of each wind turbine associated with the reference source is within a threshold variability (e.g. a threshold standard deviation or variance), or range of offsets. The data analytics platform may evaluate whether the reported nacelle orientation remained relatively steady in various other manners as well.

After identifying the one or more past windows of time during which the wind conditions captured by the reference source meet the threshold criteria, the data analytics platform may determine the expected orientation of the given wind turbine during each such past window of time. In general, the data analytics platform may make this determination based on the wind-conditions data reported by the reference source during the past window. For instance, the data analytics platform may determine the expected orientation of the given wind turbine during a given past window of time by determining a representative measure of the wind direction reported by the reference source during the given past window, which may take the form of a mean, median, mode, maximum, minimum, etc. of the wind direction values reported by the reference source over the given past window. Determining the expected orientation of the given wind turbine may take other forms as well.

In an embodiment such as this, where the reference source takes the form of a device that captures data indicating wind conditions experienced by the given wind turbine at one or more past times, the data analytics platform may determine the expected orientation of the given wind turbine at each of the one or more past times in various other manners as well.

As discussed above, in another embodiment, the reference source may be an image data source configured to provide image data comprising a visual indication of the orientation of the at least one given wind turbine at the given wind site, such as satellite image data, photographic image data, and/or video image data. In such an embodiment, the data analytics platform may obtain image data provided by the reference source at one or more past times and then perform an analysis of the image data at each of the one or more past times to determine the expected orientation of the given wind turbine at each of the one or more past times. Such an analysis may take various forms.

In one implementation, the data analytics platform may begin its analysis of a given image captured at a given time by identifying the orientation of a reference direction such as true north in the given image. The data analytics platform may make this identification in various manners. As one possibility, the image may already be oriented by the reference source, in which case the data analytics platform may identify the reference direction as the line parallel with the side of the given image.

As another possibility, the data analytics platform may use location data for identifiable points in the image, such as wind turbines, buildings, roads, intersections, power substations, concrete arrows, etc., to identify the reference direction in the given image. For instance, the data analytics platform may use trigonometry to calculate angle between the location of each of two identifiable points in the given image and the prime meridian, which then enables the data analytics platform to identify true north in the image. To illustrate with an example, consider an image where a first wind turbine has GPS coordinates of (42.45599914, −95.27395055) and a second wind turbine has GPS coordinates of (42.44558902, −95.27227238). By taking the arctangent pf (−95.27395055+95.27227238, 42.45599914−42.44558902)*360/pi, the data analytics platform can determine that the angle between the line that intersects both the wind turbines and the line parallel to the prime meridian (i.e., true north) is 18.325 degrees, which in turn enables the data analytics platform to identify the orientation of true north in the given image.

The data analytics platform may identify the orientation of a reference direction such as true north in the given image in other manners as well.

After identifying the orientation of the reference direction in the given image, the data analytics platform may then determine the orientation that the given wind turbine's nacelle is facing in the given image, which may be defined as the vector on the line perpendicular with the given wind turbine's rotor blades and directed away from the nacelle (i.e. facing away from the given wind turbine, into the wind). The data analytics platform may make this determination in various manners as well. As one possibility, the data analytics platform may apply a computer-vision technique for determining object orientation to the given image, examples of which may include principal component analysis (PCA), histogram template matching, binary connectivity analysis, and ellipse fitting, among others. As another possibility, the data analytics platform may present the given image for analysis by a human operator and then determine the orientation that the given wind turbine's nacelle is facing in the given image based on input from the human operator. Other examples are possible as well.

After identifying the reference direction in the given image and determining the orientation that the given wind turbine's nacelle is facing in the given image, the data analytics platform may then use this information to determine the orientation that the given wind turbine's nacelle relative to the reference direction (e.g., relative to true north), which is then used as the expected orientation of the given wind turbine at the given time.

It should be understood that the data analytics platform may use the image data to determine the expected orientation of the given wind turbine at each of the one or more past times in various other manners as well.

The data analytics platform may obtain reference data and then use the reference data to determine the expected orientation of the given wind turbine in other manners as well.

At block 606, the data analytics platform may also obtain measurement data that is indicative of a measured orientation of the given wind turbine at each of the one or more past times. The data analytics platform may obtain this measurement data in various manners. As one example, the data analytics platform may receive this measurement data from the given wind turbine (e.g., as part of the wind-turbine data received from the given wind turbine). As another example, the data analytics platform may receive this measurement data from an intermediate device that sits between the data analytics platform and the given wind turbine. The data analytics platform may obtain this measurement data in other manners as well.

Further, the measurement data may take various forms. In line with the discussion above, the measurement data may indicate the measured orientation of the given wind turbine's nacelle relative to the installation direction of the given wind turbine alone, or relative to the installation direction of the given wind turbine and some manual adjustment factor, among other possibilities. For example, if the turbine 300 of FIG. 3 is installed facing 45 degrees (i.e., northeast), and the yaw system 310 reports that the nacelle 306 has an offset of 90 degrees, the nacelle may face 135 degrees (45+90 degrees), i.e. southeast. In this respect, the measurement data may be represented in terms of an angle ranging from 0 to 360 degrees, or may be represented using some other unit of measurement.

At block 608, after the data analytics platform obtains the measurement data that is indicative of the measured orientation of the given wind turbine at the one or more past times, the data analytics platform may then use the obtained measurement data to determine the measured orientation of the given wind turbine at each of the one or more past times. The data analytics platform may perform this function in various manners.

As discussed above, in one embodiment, the one or more past times may comprise one or more past windows of time during which the wind conditions experienced by the given wind turbine (as indicated by the reference source) meet threshold criteria. In such an embodiment, the data analytics platform may determine the measured orientation of the given wind turbine during each such past window of time. For instance, the data analytics platform may determine the measured orientation of the given wind turbine during a given past window of time by determining a representative measure of the given wind turbine's measured nacelle orientation during the given past window of time, which may take the form of a mean, median, mode, maximum, minimum, etc. of the nacelle orientation values reported by the given wind turbine over the given past window of time.

In another embodiment, the one or more past times may comprise one or more past points in time during which image data was captured for the given wind turbine (i.e., one or more image-capture times). In such an embodiment, the data analytics platform may determine the measured orientation of the given wind turbine at each such point in time based on the one or more nacelle orientation values reported by the given wind turbine at or around the image-capture time. For example, the data analytics platform may determine the measured orientation of the given wind turbine at a given image-capture time to be whichever orientation value reported by the given wind turbine has a measurement time that is closest to the given image-capture time. As another example, the data analytics platform may determine the measured orientation of the given wind turbine at a given image-capture time to be a representative measure of two or more orientation values reported by the given wind turbine having measurement times that are closest to the given image-capture time. Other examples are possible as well.

At block 610, after the data analytics platform has determined the expected and measured orientation of the given wind turbine at each of the one or more past times, the data analytics platform may determine an orientation offset for the given wind turbine based on a comparison between the expected orientation of the given wind turbine and the measured orientation of the given wind turbine at each of the one or more past times. The data analytics platform may carry out this function in various manners.

In one implementation, the comparison of the expected orientation of the given wind turbine to the measured orientation of the given wind turbine at each of the one or more past times may involve the data analytics platform determining a respective difference (or "offset value") between the expected orientation of the given wind turbine and the measured orientation of the given wind turbine at each of the one or more past times, thereby resulting in a set of one or more offset values for the given wind turbine that correspond to the one or more past times. In turn, the data analytics platform may use this set of one or more offset values to determine an overall orientation offset for the given wind turbine. The data analytics platform may perform this function in various manners.

As one example, the data analytics platform may first evaluate the set of one or more offset values for the given wind turbine to verify that the above process resulted in offset values for the given turbine that are relatively consistent and/or identify any outliers (e.g., offset values that appear to be associated with past times during which the given wind turbine was not operational or was operating abnormally). For example, the data analytics platform may identify and remove "outlier" offset values that fall outside of a certain range of offset values (e.g., a range of standard deviations or given quartiles) or otherwise fail to meet certain threshold criteria. The data analytics platform may identify and remove "outlier" offset values in various other manners as well.

After excluding any "outlier" offset values from the set, the data analytics platform may use the remaining one or more offset values in the set to determine a representative offset value for the given wind turbine, such as by determining the mean, median, mode, maximum, minimum, etc. of the remaining offset values in the set. This representative offset value may then be used as the orientation offset for the given wind turbine.

While the process above is described in the context of a single wind turbine, it should be understood that the data analytics platform may carry out a similar process to determine a respective orientation offset for each of one or more other wind turbines at the given wind site as well. In this respect, the reference source for the one or more other wind turbines may be the same as or different from the reference source for the given wind turbine. The process for determining the orientation offset for a given wind turbine may take various other forms as well.

At block 612, once the orientation offset for the given wind turbine is determined, the data analytics platform may then cause the orientation offset for the given wind turbine to be applied to the nacelle orientations reported by the given wind turbine, thereby resulting in nacelle orientation measurements that reflect the orientation of the given wind turbine's nacelle according to standardized reference direction, such as true north. The data analytics platform may perform this function in various manners.

In one implementation, the data analytics platform may send the orientation offset to the given wind turbine (either directly or via one or more intermediary devices) along with an instruction for the given wind turbine to apply the orientation offset to its measured orientation before reporting its nacelle orientation.

In another implementation, the data analytics platform may apply the orientation offset after receiving the reported nacelle orientation from the given wind turbine. In practice, the data analytics platform may perform this function by (1) maintaining an association between a given wind turbine and its determined orientation offset, and then (2) responsive to receiving a reported nacelle orientation for that given wind turbine, applying the determined orientation offset to the given turbine's reported orientation value to produce a resulting nacelle orientation measurement that accurately reflects the orientation of the given turbine's nacelle relative to standardized reference direction such as true north. Other examples are possible as well.

While the techniques are described in the application as being carried out a data analytics platform, it should be understood that some or all of the functions may be carried out by an entity other than the data analytics platform. As one alternate implementation, it is possible that a server (or the like) at the wind site may be configured to perform this method. As another one alternate implementation, it is possible that the wind turbines and/or the MET tower may be configured with a local analytics device capable of carrying out these functions. For example, it is possible that each turbine has its own local analytics devices that separately performs the analysis of the MET data. As another example, it is possible that the MET tower has an analytics device that figures out the windows and then reports the windows & source direction measurements to the wind turbines, which in turn figure out their own respective offset values. Other implementations are possible as well.

VI. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

The invention claimed is:

1. A computing system comprising:
a network interface configured to facilitate communications over a communication network with one or more wind-turbine data sources;
at least one processor;
a non-transitory computer-readable medium; and
program instructions stored on the non-transitory computer-readable medium that are executable by the at least one processor to cause the computing system to:
obtain wind-conditions data captured by a reference device that is located at a wind site and configured to measure wind conditions experienced by at least one given wind turbine at the wind site, wherein the reference device is distinct from any wind turbine at the wind site;
based on the wind-conditions data, identify a plurality of past times during which the wind conditions experienced by the given wind turbine met threshold criteria indicating relatively reliable wind conditions at the given wind turbine by: (i) identifying an initial set of past windows of time during which the wind conditions experienced by the given wind turbine met threshold criteria indicating relatively reliable wind conditions at the given wind turbine, (ii) evaluating the past windows of time in the initial set based on one or more factors, and (iii) based on the evaluating, identifying a first subset of past windows of time in the initial set that are preferable to a second subset of past windows of time in the initial set, wherein the identified first subset of the past windows of time comprises the identified plurality of past times;
based on the wind conditions experienced by the given wind turbine during the identified plurality of past times, determine the expected orientation of the given wind turbine at each of the identified plurality of past times;
obtain measurement data that is indicative of a measured orientation of the given wind turbine at each of the identified plurality of past times;
use the measurement data to determine the measured orientation of the given wind turbine at each of the identified plurality of past times;
determine, for each of the identified plurality of past times, a respective difference value between the expected orientation of the given wind turbine and the measured orientation of the given wind turbine;
determine a representative difference value between the expected orientation of the given wind turbine and the measured orientation of the given wind turbine that comprises an average of the respective difference values for the identified plurality of past times, wherein the representative difference value is designated as an orientation offset for the given wind turbine; and
cause the orientation offset for the given wind turbine to be applied to at least one nacelle orientation reported by the given wind turbine.

2. The computing system of claim 1, wherein the program instructions that are executable by the at least one processor to cause the computing system to evaluate the past windows of time in the initial set based on one or more factors comprise program instructions stored on the non-transitory computer-readable medium that are executable by the at least one processor to cause the computing system to:
evaluate the past windows of time in the initial set based on at least one of wind speed variability or wind direction variability.

3. The computing system of claim 1, wherein the program instructions that are executable by the at least one processor to cause the computing system to determine the expected orientation of the given wind turbine during each of the identified plurality of past times comprise program instructions stored on the non-transitory computer-readable medium that are executable by the at least one processor to cause the computing system to:
for each of the identified plurality of past times, determine a representative measure of wind direction values captured by the reference device.

4. The computing system of claim 1, wherein the threshold criteria indicating relatively reliable wind conditions at the given wind turbine comprises:
a past window of time lasting at least a threshold length of time during which (1) a wind speed remains above a minimum wind speed, (2) a wind direction variability remains below a threshold amount of wind direction variability, and (3) a wind speed variability remains below a threshold amount of wind speed variability.

5. The computing system of claim 1, wherein the program instructions that are executable by the at least one processor to cause the computing system to cause the orientation offset for the given wind turbine to be applied to at least one nacelle orientation reported by the given wind turbine comprise program instructions stored on the non-transitory computer-readable medium that are executable by the at least one processor to cause the computing system to:
send the orientation offset to the given wind turbine with an instruction for the given wind turbine to apply the orientation offset before reporting the nacelle orientation.

6. The computing system of claim 1, wherein the program instructions that are executable by the at least one processor to cause the computing system to cause the orientation offset for the given wind turbine to be applied to at least one nacelle orientation reported by the given wind turbine comprise program instructions stored on the non-transitory computer-readable medium that are executable by the at least one processor to cause the computing system to:
maintain an association between the given wind turbine and the orientation offset for the given wind turbine; and
responsive to receiving a reported nacelle orientation for the given wind turbine, cause the orientation offset for the given wind turbine to be applied to the reported nacelle orientation.

7. The computing system of claim 1, wherein the representative difference value that comprises the average of the respective difference values for the identified plurality of past times is a representative difference value that comprises one of (a) a mean of the respective difference values for the identified plurality of past times, (b) a median of the respective difference values for the identified plurality of past times, or (c) a mode of the respective difference values for the identified plurality of past times.

8. A method performed by a computing system, the method comprising:
   obtaining wind-conditions data captured by a reference device that is located at a wind site and configured to measure wind conditions experienced by at least one given wind turbine at the wind site, wherein the reference device is distinct from any wind turbine at the wind site;
   based on the wind-conditions data, identifying a plurality of past times during which the wind conditions experienced by the given wind turbine met threshold criteria indicating relatively reliable wind conditions at the given wind turbine by: (i) identifying an initial set of past windows of time during which the wind conditions experienced by the given wind turbine met threshold criteria indicating relatively reliable wind conditions at the given wind turbine, (ii) evaluating the past windows of time in the initial set based on one or more factors, and (iii) based on the evaluating, identifying a first subset of past windows of time in the initial set that are preferable to a second subset of past windows of time in the initial set, wherein the identified first subset of the past windows of time comprises the identified plurality of past times;
   based on the wind conditions experienced by the given wind turbine during the identified plurality of past times, determining the expected orientation of the given wind turbine at each of the identified plurality of past times;
   obtaining measurement data that is indicative of a measured orientation of the given wind turbine at each of the identified plurality of past times;
   using the measurement data to determine the measured orientation of the given wind turbine at each of the identified plurality of past times;
   determining, for each of the identified plurality of past times, a respective difference value between the expected orientation of the given wind turbine and the measured orientation of the given wind turbine;
   determining a representative difference value between the expected orientation of the given wind turbine and the measured orientation of the given wind turbine that comprises an average of the respective difference values for the identified plurality of past times, wherein the representative difference value is designated as an orientation offset for the given wind turbine; and
   causing the orientation offset for the given wind turbine to be applied to at least one nacelle orientation reported by the given wind turbine.

9. The method of claim 8, wherein the threshold criteria indicating relatively reliable wind conditions at the given wind turbine comprises:
   a past window of time lasting at least a threshold length of time during which (1) a wind speed remains above a minimum wind speed, (2) a wind direction variability remains below a threshold amount of wind direction variability, and (3) a wind speed variability remains below a threshold amount of wind speed variability.

10. The method of claim 8, wherein causing the orientation offset for the given wind turbine to be applied to at least one nacelle orientation reported by the given wind turbine comprises:
   sending the orientation offset to the given wind turbine with an instruction for the given wind turbine to apply the orientation offset before reporting the nacelle orientation.

11. The method of claim 8, wherein the representative difference value that comprises the average of the respective difference values for the identified plurality of past times is a representative difference value that comprises one of (a) a mean of the respective difference values for the identified plurality of past times, (b) a median of the respective difference values for the identified plurality of past times, or (c) a mode of the respective difference values for the identified plurality of past times.

12. The method of claim 8, wherein determining the expected orientation of the given wind turbine during each of the identified plurality of past times comprises:
   for each of the identified plurality of past times, determining a representative measure of wind direction values captured by the reference device.

13. The method of claim 8, wherein evaluating the past windows of time in the initial set based on one or more factors comprises:
   evaluating the past windows of time in the initial set based on at least one of wind speed variability or wind direction variability.

14. A non-transitory computer-readable storage medium having program instructions stored thereon that are executable to cause a computing system to:
   obtain wind-conditions data captured by a reference device that is located at a wind site and configured to measure wind conditions experienced by at least one given wind turbine at the wind site, wherein the reference device is distinct from any wind turbine at the wind site;
   based on the wind-conditions data, identify a plurality of past times during which the wind conditions experienced by the given wind turbine met threshold criteria indicating relatively reliable wind conditions at the given wind turbine by: (i) identifying an initial set of past windows of time during which the wind conditions experienced by the given wind turbine met threshold criteria indicating relatively reliable wind conditions at the given wind turbine, (ii) evaluating the past windows of time in the initial set based on one or more factors, and (iii) based on the evaluating, identifying a first subset of past windows of time in the initial set that are preferable to a second subset of past windows of time in the initial set, wherein the identified first subset of the past windows of time comprises the identified plurality of past times;
   based on the wind conditions experienced by the given wind turbine during the identified plurality of past times, determine the expected orientation of the given wind turbine at each of the identified plurality of past times;
   obtain measurement data that is indicative of a measured orientation of the given wind turbine at each of the identified plurality of past times;
   use the measurement data to determine the measured orientation of the given wind turbine at each of the identified plurality of past times;
   determine, for each of the identified plurality of past times, a respective difference value between the expected orientation of the given wind turbine and the measured orientation of the given wind turbine;
   determine a representative difference value between the expected orientation of the given wind turbine and the measured orientation of the given wind turbine that comprises an average of the respective difference values for the identified plurality of past times, wherein the representative difference value is designated as an orientation offset for the given wind turbine; and cause the orientation offset for the given wind turbine o be applied to at least one nacelle orientation reported by the given wind turbine.

15. The non-transitory computer-readable storage medium of claim 14, wherein the threshold criteria indicating relatively reliable wind conditions at the given wind turbine comprises:

a past window of time lasting at least a threshold length of time during which (1) a wind speed remains above a minimum wind speed, (2) a wind direction variability remains below a threshold amount of wind direction variability, and (3) a wind speed variability remains below a threshold amount of wind speed variability.

16. The non-transitory computer-readable storage medium of claim 14, wherein the representative difference value that comprises the average of the respective difference values for the identified plurality of past times is a representative difference value that comprises one of (a) a mean of the respective difference values for the identified plurality of past times, (b) a median of the respective difference values for the identified plurality of past times, or (c) a mode of the respective difference values for the identified plurality of past times.

17. The non-transitory computer-readable storage medium of claim 14, wherein the program instructions that are executable to cause the computing system to determine the expected orientation of the given wind turbine during each of the identified plurality of past times comprise program instructions stored on the non-transitory computer-readable storage medium that are executable to cause the computing system to:

for each of the identified plurality of past times, determine a representative measure of wind direction values captured by the reference device.

18. The non-transitory computer-readable storage medium of claim 14, wherein the program instructions that are executable to cause the computing system to cause the orientation offset for the given wind turbine to be applied to at least one nacelle orientation reported by the given wind turbine comprise program instructions stored on the non-transitory computer-readable storage medium that are executable to cause the computing system to:

send the orientation offset to the given wind turbine with an instruction for the given wind turbine to apply the orientation offset before reporting the nacelle orientation.

19. The non-transitory computer-readable storage medium of claim 14, wherein the program instructions that are executable to cause the computing system to evaluate the past windows of time in the initial set based on one or more factors comprise program instructions stored on the non-transitory computer-readable storage medium that are executable to cause the computing system to:

evaluate the past windows of time in the initial set based on at least one of wind speed variability or wind direction variability.

\* \* \* \* \*